(12) United States Patent
Miyase et al.

(10) Patent No.: US 10,567,611 B2
(45) Date of Patent: Feb. 18, 2020

(54) IMAGE READING APPARATUS

(71) Applicant: Brother Kogyo Kabushiki Kaisha, Nagoya-shi, Aichi-ken (JP)

(72) Inventors: Satoshi Miyase, Nagoya (JP); Katsuro Miura, Toyota (JP); Tianjin Xie, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/363,370

(22) Filed: Mar. 25, 2019

(65) Prior Publication Data

US 2019/0306364 A1 Oct. 3, 2019

(30) Foreign Application Priority Data

Mar. 27, 2018 (JP) ................. 2018-059977

(51) Int. Cl.
*H04N 1/00* (2006.01)
*H04N 1/203* (2006.01)
*H04N 1/10* (2006.01)

(52) U.S. Cl.
CPC ......... *H04N 1/2032* (2013.01); *H04N 1/0066* (2013.01); *H04N 1/00588* (2013.01); *H04N 1/00615* (2013.01); *H04N 1/1043* (2013.01)

(58) Field of Classification Search
CPC ............ B65H 2220/01; B65H 2220/02; B65H 2511/11; B65H 2511/20; B65H 2511/415; B65H 2513/10; B65H 2220/11; B65H 2301/4212; B65H 2301/4213; B65H 2403/942; B65H 2404/1521; B65H 2404/632; B65H 2404/693; B65H 2801/27; B65H 29/125; B65H 29/14; B65H 29/60;
(Continued)

(56) References Cited

U.S. PATENT DOCUMENTS 5,452,887 A * 9/1995 Okumura ................ B42C 1/125
270/58.08
2004/0218230 A1 11/2004 Furihata
(Continued)

FOREIGN PATENT DOCUMENTS

JP 2000-296945 A 10/2000
JP 2004-297760 A 10/2004
(Continued)

*Primary Examiner* — Negussie Worku
(74) *Attorney, Agent, or Firm* — Banner & Witcoff, Ltd.

(57) ABSTRACT

An image reading apparatus includes a housing, a transport unit, a first reader, a controller, and a positioning mechanism. The controller controls the transport unit to transport a second medium different in thickness from a first medium in a first transport direction and then in a second transport direction opposite to the first transport direction. The positioning mechanism moves the first reader from a first position to a second position by using a drive force by which the transport unit transports the second medium in the first transport direction. The positioning mechanism maintains the first reader at the second position while the second medium transported by the transport unit in the second transport direction is passing the first reader, and moves the first reader from the second position to the first position after the first reader reads the image on the first side of the second medium.

16 Claims, 14 Drawing Sheets

(58) Field of Classification Search
CPC .... B65H 31/10; B65H 31/26; B65H 31/3027;
B65H 37/04; B65H 43/00; B41J 13/103;
B41J 11/00; B41J 11/0045; B41J 11/006;
B41J 13/00; B41J 13/0018; B41J 13/02;
B41J 3/60
USPC .................. 347/104; 358/498, 496; 271/900;
399/303
See application file for complete search history.

(56) References Cited

U.S. PATENT DOCUMENTS

| | | | |
|---|---|---|---|
| 2012/0105925 A1 | 5/2012 | Shirai et al. | |
| 2015/0183242 A1* | 7/2015 | Shirane | B41J 13/0009 347/16 |
| 2017/0057773 A1* | 3/2017 | Nakano | B65H 29/60 |
| 2017/0075283 A1* | 3/2017 | Dobashi | G03G 15/6541 |
| 2017/0282609 A1* | 10/2017 | Yatsunami | B41J 13/0009 |
| 2018/0139340 A1* | 5/2018 | Miyamoto | B65H 1/266 |
| 2019/0030920 A1* | 1/2019 | Mori | B65H 31/02 |
| 2019/0070869 A1* | 3/2019 | Nakahata | B41J 11/0045 |

FOREIGN PATENT DOCUMENTS

| | | |
|---|---|---|
| JP | 2009-232035 A | 10/2009 |
| JP | 2009-303085 A | 12/2009 |
| JP | 2012-100115 A | 5/2012 |
| JP | 2016-019141 A | 2/2016 |
| JP | 2016-019142 A | 2/2016 |
| JP | 3204815 U | 6/2016 |
| JP | 2016-219958 A | 12/2016 |

\* cited by examiner

IMAGE READING APPARATUS

CROSS-REFERENCE TO RELATED APPLICATION

This application claims priority from Japanese Patent Application No. 2018-059977 filed on Mar. 27, 2018, the content of which is incorporated herein by reference in its entirety.

TECHNICAL FIELD

The disclosure relates to an image reading apparatus.

BACKGROUND

A known image reading apparatus includes a reader configured to read an image on a first side of a first medium at a first position, and to read an image on a first side of a second medium, which is different in thickness from the first medium, at a second position. The reader is urged by an urging member to the first position. Contact of the second medium with the reader causes the reader to move from the first position to the second position. When the second medium loses contact with the reader, the reader moves back to the first position from the second position due to an urging force of the urging member.

SUMMARY

However, contact of the second medium with the reader might cause the second medium to be transported in a skewed manner, disabling the reader to accurately read an image of the second medium.

It may be beneficial for an image reading apparatus to include a reader configured to read, at high accuracy, an image on a first side of each of a first medium and a second medium while providing an improved convenience for users.

According to one or more aspect of the discloser, an image reading apparatus comprises a housing, a transport unit, a first reader, a controller, and a positioning mechanism. The housing includes a first inlet into which a first medium is inserted, a second inlet which is disposed at a different position from the first inlet and into which a second medium different in thickness from the first medium is inserted. The transport guide is configured to guide the first medium and the second medium. The transport unit is disposed in the housing and configured to transport the first medium and the second medium guided by the transport guide. The first reader is disposed in the housing and configured to read an image on a first side of each of the first medium and the second medium. The controller is disposed in the housing and configured to control the transport unit to transport the second medium to and beyond the first reader in a first transport direction. After an entirety of the second medium has passed the first reader in the first transport direction, the controller is configured to control the transport unit to transport the second medium to the first reader in a second transport direction opposite to the first transport direction. The controller is configured to control the first reader to read the image on the first side of the second medium being transported in the second transport direction. The positioning mechanism is disposed in the housing and configured to move the first reader between a first position corresponding to the first medium and a second position corresponding to the second medium. The positioning mechanism is configured to move the first reader from the first position to the second position by using a drive force by which the transport unit transports the second medium in the first transport direction. The positioning mechanism is configured to maintain the first reader at the second position while the second medium transported by the transport unit in the second transport direction is passing the first reader, and configured to move the first reader from the second position to the first position after the first reader reads the image on the first side of the second medium.

According to one or more aspect of the discloser, an image reading apparatus comprises a housing including a first inlet, a second inlet disposed at a different position from the first inlet, and a switchback opening; a transport path extending substantially horizontally between the second inlet and the switchback opening; a reader disposed along the transport path and configured to read an image on a card; a sensor disposed adjacent to the second inlet; a transport unit configured to transport the card along the transport path; a positioning mechanism configured to move the reader between a first position and a second position; a motor configured to supply a drive force to the transport unit and the positioning mechanism; and a controller. The controller is configured to, in response to the sensor detecting the card at the first inlet, activate the motor such that the transport unit transports the card via the reader toward the switchback opening in a first transport direction along the transport path; in response to an expiration of a first time period since activation of the motor, stop the motor and reactivate the motor such that the transport unit transports the card via the reader toward the second inlet in a second transport direction opposite to the first transport direction along the transport path; control the reader to read the image on the card while continuing to drive the motor for the transport unit to transport the card in the second transport direction; and in response to an expiration of the first time period since reactivation of the motor, stop the motor. The positioning mechanism is further configured to, in response to the activation of the motor, move the reader from the first position to the second position by using the drive force from the motor; and in response to the reactivation of the motor, maintain the reader at the second position while the transport unit transports the card in the second transport direction until an entirety of the card has passed the reader in the second transport direction and then move the reader from the second position to the first position by using the drive force from the motor.

DETAILED DESCRIPTION

First and second embodiments of the disclosure will now be described with reference to the drawings.

First Embodiment

Figure 1:
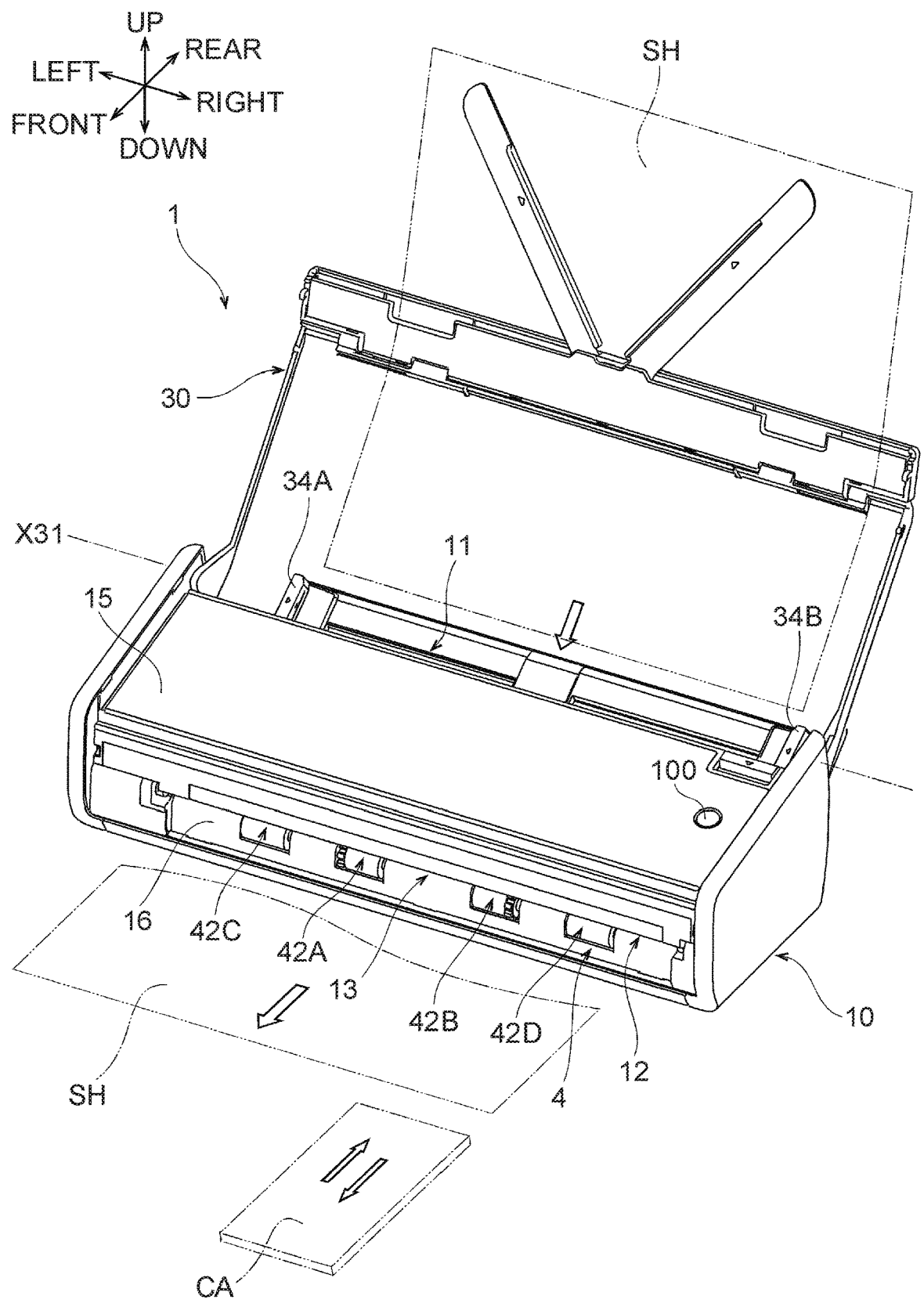
FIG. 1 is a perspective view of an image reading apparatus according to a first embodiment.

FIG. 1 shows an image reading apparatus 1 in a first embodiment according to one or more aspects of the disclosure. In FIG. 1, one end of the image reading apparatus 1 having an outlet 13 is the front, and one side of the image reading apparatus 1 on the left when viewed in the direction facing the outlet 13 is the left. The front, rear, left, right, up, and down shown in FIG. 2 and subsequent drawings correspond to the directions in FIG. 1. The components of the image reading apparatus 1 will be described with reference to FIG. 1 and other drawings.

Overall Structure

As shown in FIGS. 1-4, the image reading apparatus 1 includes a housing 10. The housing 10 is substantially box-shaped and includes an upper chute 25, a lower chute 26, and a lower frame 27 which are covered by an exterior cover. The housing 10 also includes a first inlet 11, the outlet 13, a transport guide 20, a second inlet 12, a start button 100, a sheet sensor 101, a card sensor 102, a switchback opening 14, and a switchback guide 24.

Figure 3:
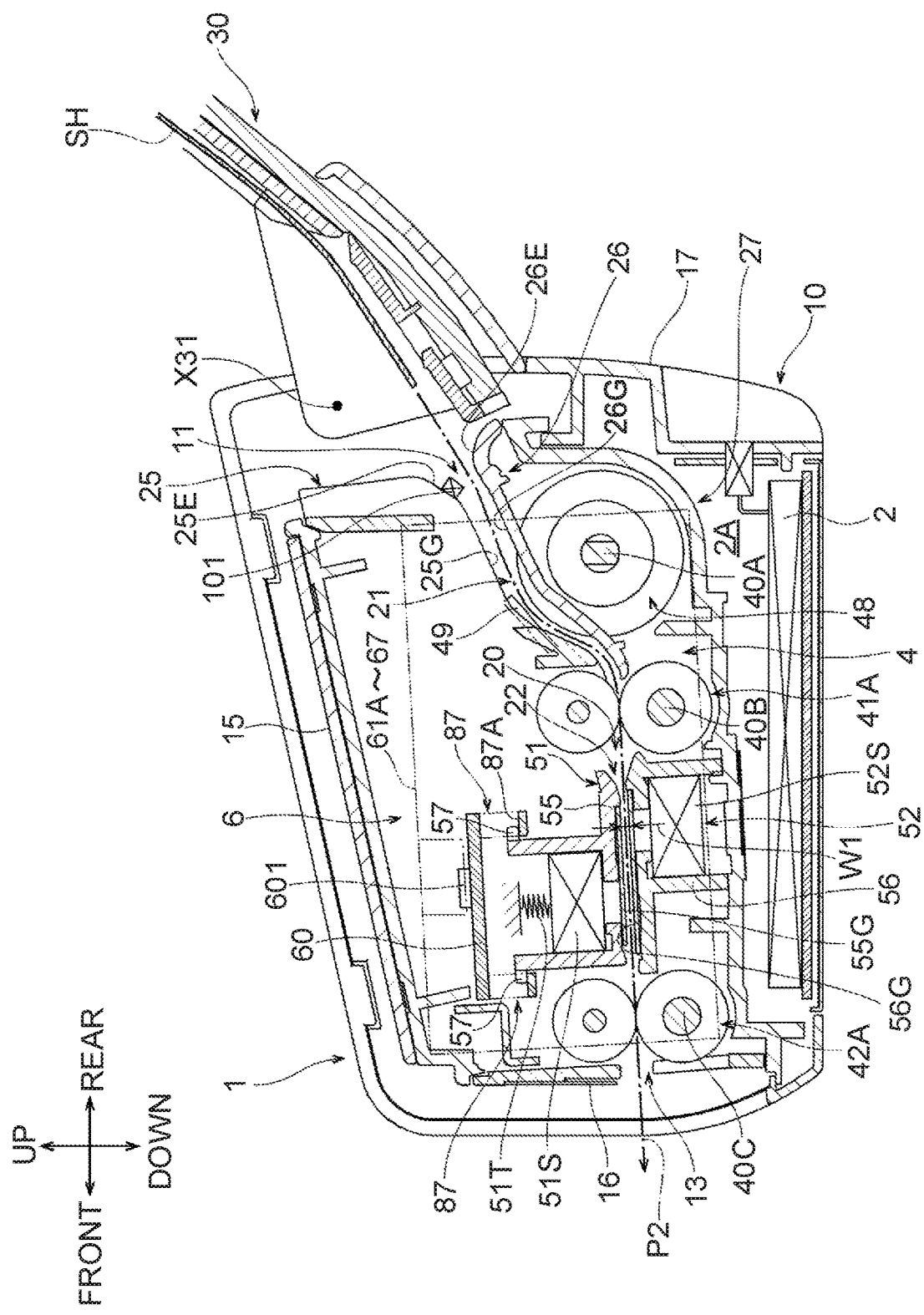
FIG. 3 is a schematic cross-sectional view, taken along line A-A, of the image reading apparatus in FIG. 2 according to the first embodiment, showing a first reader at a first position.

The first inlet 11 is formed between a rear end of an upper wall 15 of the housing 10 and an upper end of a rear wall 17 of the housing 10. The first inlet 11 is a substantially rectangular opening elongate in a left-right direction and formed between a rear end 25E of the upper chute 25 and a rear end 26E of the lower chute 26. As shown in FIGS. 1 and 3, a sheet SH, such as a paper sheet or an overhead projector (OHP) sheet is inserted into the first inlet 11. The sheet SH is an example of a first medium. Examples of sheets SH include an A4 or letter size paper sheet and a postcard. Business or other cards which are relatively narrow and as thin and flexible as a paper sheet may be inserted, as sheets SH, into the first inlet 11. The length of the first inlet 11 in the left-right direction is set to be slightly greater than the width of a sheet SH of a maximum size.

As shown in FIG. 3, the sheet sensor 101 is disposed in the first inlet. The sheet sensor 101 detects a sheet SH inserted into the first inlet and send a sheet detection signal to a controller 2 to be described later.

As shown in FIGS. 1-4, the outlet 13 is formed in a vertically middle portion of a front wall 16 to be a substantially rectangular opening elongate in a left-right direction. As shown in FIGS. 1 and 3, a sheet SH is discharged from the outlet 13. The length of the outlet 13 in the left-right direction is set to be slightly greater than the width of a sheet SH of a maximum size.

Figure 4:
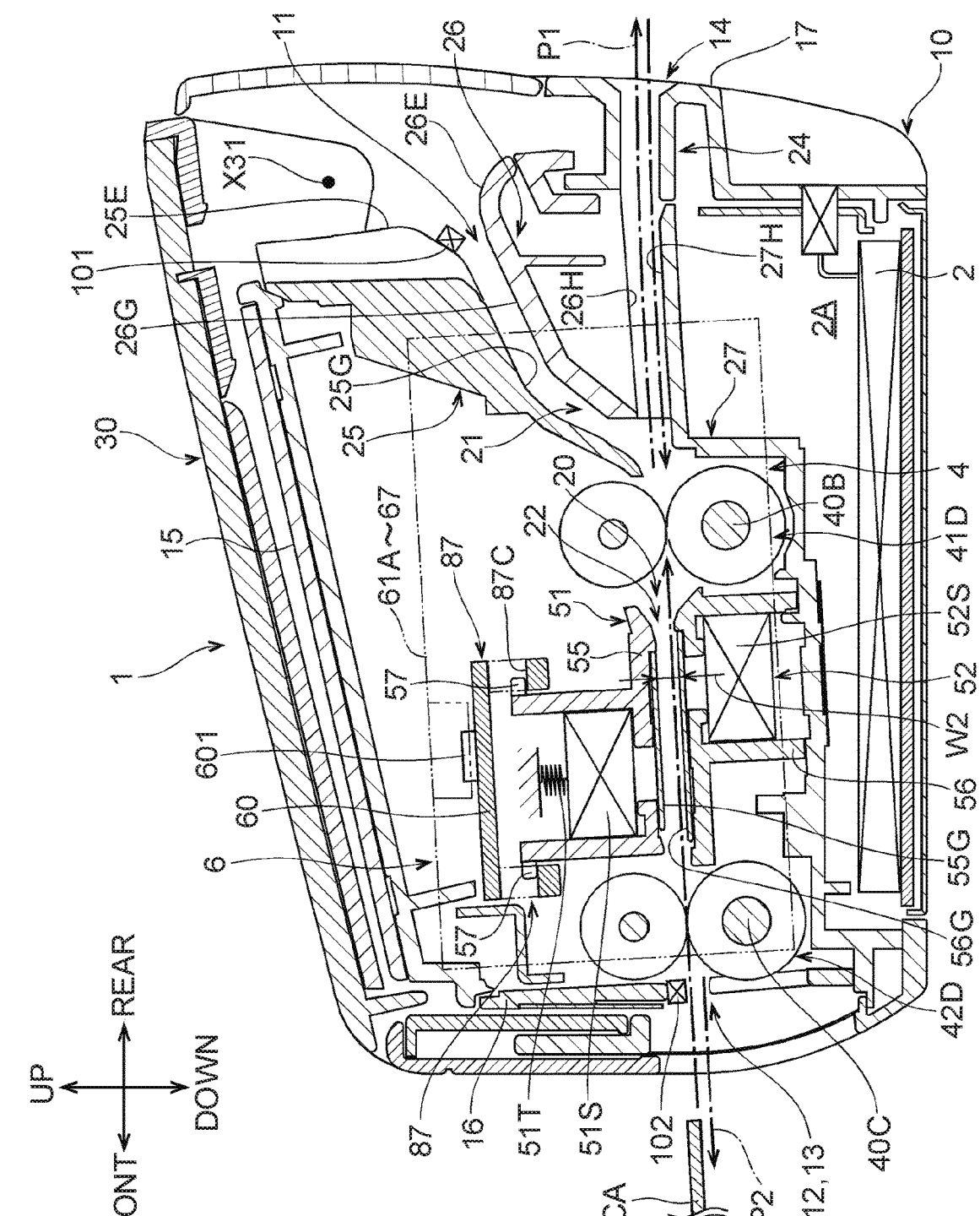
FIG. 4 is a schematic cross-sectional view, taken along line B-B, of the image reading apparatus in FIG. 2 according to the first embodiment, showing the first reader at a second position.

As shown in FIGS. 3 and 4, the lower chute 26 includes a transport surface 26G which extends obliquely frontward and downward from the rear end 26E. The upper chute 25 includes a guide surface 25G which extends, along the transport surface 26G, obliquely frontward and downward from the rear end 25E. A second reader holder 56 is disposed below and further toward the front than the transport surface 26G of the lower chute 26 in the housing 10. The second reader holder 56 includes, at its upper surface, a transport surface 56G facing up and extending substantially horizontally. A first reader holder 55 is disposed in front of the guide surface 25G of the upper chute 25. The first reader holder 55 includes, at is lower surface, a guide surface 55G facing the transport surface 56G and extending substantially horizontally.

The transport guide 20 includes a first guide 21 and a second guide 22. The first guide 20 includes the transport surface 26G of the lower chute 26 and the guide surface 25G of the upper chute 25. A rear end of the first guide 21 is connected to the first inlet 11. A sheet SH inserted into the first inlet 11 is guided to the first guide 21. The first guide 21 guides the sheet SH obliquely frontward and downward. The second guide 22 includes the transport surface 56G of the second reader holder 56 and the guide surface 55G of the first reader holder 55. A rear end of the second guide 22 is connected to a front end of the first guide 21. The second guide 22 extends substantially horizontally frontward and reaches the outlet 13. The second guide 22 guides the sheet SH guided by the first guide 21 toward the outlet 13.

Figure 2:
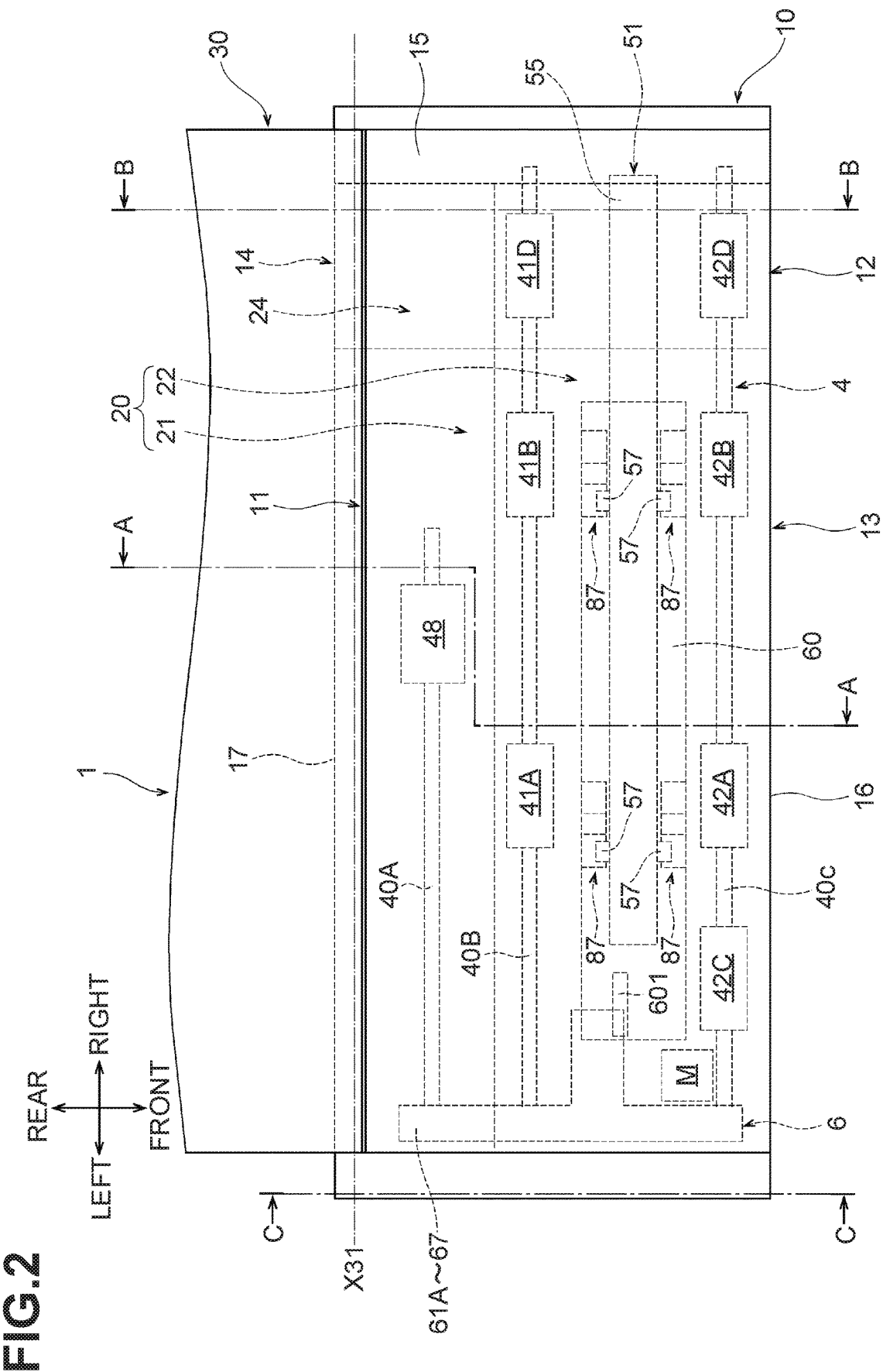
FIG. 2 is a schematic top view of the image reading apparatus according to the first embodiment.

As shown in FIGS. 1 and 2, a right portion of the outlet 13 is also served as the second inlet 12. The second inlet 12 is formed in the right portion of the front wall 16 of the housing 10, at a different position from the first inlet 11. A card CA having a relatively small area is inserted into the second inlet 12. Examples of cards CA include a business card, a cash card, a membership card, and a driver's license. The card CA is an example of a second medium. The length of the second inlet 12 in the left-right direction is set to be slightly greater than the width of cards CA. The cards CA are mainly made of plastic or cardboard and thicker and less flexible than the sheets SH. The cards CA are different in thickness from the sheets SH.

For example, the cards CA, specified by the ID-1 format defined in International Organization for Standardization (ISO)/International Electrotechnical Commission (IEC), each have a short side of 53.98 mm, a long side of 85.60 mm, and a thickness of 0.76 mm A card CA inserted into the second inlet 12 is guided to the right portion of the second guide 22. The right portion of the second guide 22 guides the card CA rearward and then frontward.

The start button 100 shown in FIG. 1, when pressed by a user, sends a reading start signal to the controller 2. The card sensor 102 shown in FIG. 4 is disposed in the right portion of the front wall 16 of the housing 10, and in the second inlet 102. The card sensor 102 detects a leading edge of the card CA inserted into the second inlet 12 and sends a card detection signal to the controller 2 based on detecting the leading edge of the card CA.

As shown in FIGS. 2 and 4, the switchback opening 14 is formed in a right portion of the rear wall 17 of the housing 10, at a position extended rearward from the second guide 22. The switchback opening 14 is slightly greater in width and thickness than the card CA.

As shown in FIG. 4, the lower frame 27 includes a transport surface 27H extending from a rear end of the second guide 22 to the switchback opening 14. The lower chute 26 includes, at its lower surface, a guide surface 26H. The guide surface 26H extends, along the transport surface 27, from the rear end of the second guide 22 to the switchback opening 14.

The switchback guide 24 includes the transport surface 27H of the lower frame 27 and the guide surface 26H of the lower chute 26. The switchback guide 24 guides toward the switchback opening 14 the card CA guided by the right portion of the second guide 22. The card CA guided by the switchback guide 24 is exposed to an exterior of the housing 10 from the switchback opening 14. The switchback guide 24 guides the card CA toward the right portion of the second guide 22 which in turn guides the card CA toward the right portion of the outlet 13.

Totally a combination of the second guide 22 and the switchback guide 24 form a transport path extending substantially horizontally for transporting the card CA back and forth between the outlet 13 and the switchback opening 14.

As shown in FIGS. 1-4, the image reading apparatus 1 includes a feed tray 30. The feed tray 30 is supported by the housing 10 pivotably about a pivot axis X31. The pivot axis X31 extends in the left-right direction at a position above and further toward the rear than the first inlet 11. This allows the feed tray 30 to pivot between an open position shown in FIGS. 1-3 and a closed position shown in FIG. 4.

As typically shown in FIG. 3, the feed tray 30 located at the open position extends obliquely rearward and upward, continuously from the transport surface 26G, to expose the first inlet 11. The feed tray in this state supports sheets SH inserted into the first inlet 11. As shown in FIG. 1, the feed tray 30 includes a pair of side guides 34A, 34B slidable in the left-right direction. The side guides 34A, 34B move toward and away from each other to sandwich sheets SH of different sizes, thereby aligning the sheets SH to a central portion in a width direction of the first inlet 11. As shown in FIG. 4, the feed tray 30 located in the closed position covers the upper wall 15 of the housing 10, thereby covering the first inlet 11.

Drive Control

As shown in FIGS. 2-4, the image reading apparatus 1 includes a controller 2, a transport unit 4, a first reader 51, a second reader 52, and a positioning mechanism 6. The controller 2 is electrically connected to the start bottom 100, the sheet sensor 101, and the card sensor 102, and additionally to a motor M, a first reading sensor 51S of the first reader 51, and a second reading sensor 52S of the second reader 52. The motor M and the first and second reading sensors 51S, 52S will be described later.

As typically shown in FIG. 3, the controller 2 is disposed in a space 2A below the lower frame 27 of the housing 10. The controller 2 is a control board with an electronic circuit including a central processing unit (CPU). The controller 2 controls the motor M and the first and second reading sensors 51S, 52S upon receipt of a reading start signal, a sheet detection signal, and a card detection signal.

As shown in FIGS. 2-4, the transport unit 4 includes the motor M, a separation roller 48, a separation pad 49, three pairs of first transport rollers 41A, 41B, 41D, and four pairs of second transport rollers 42A, 42B, 42C, 42D. The first roller pairs 41A, 41B, 41C and the second roller pairs 42A, 42B, 42C, 42D each are an example of a transport roller.

Figure 5:
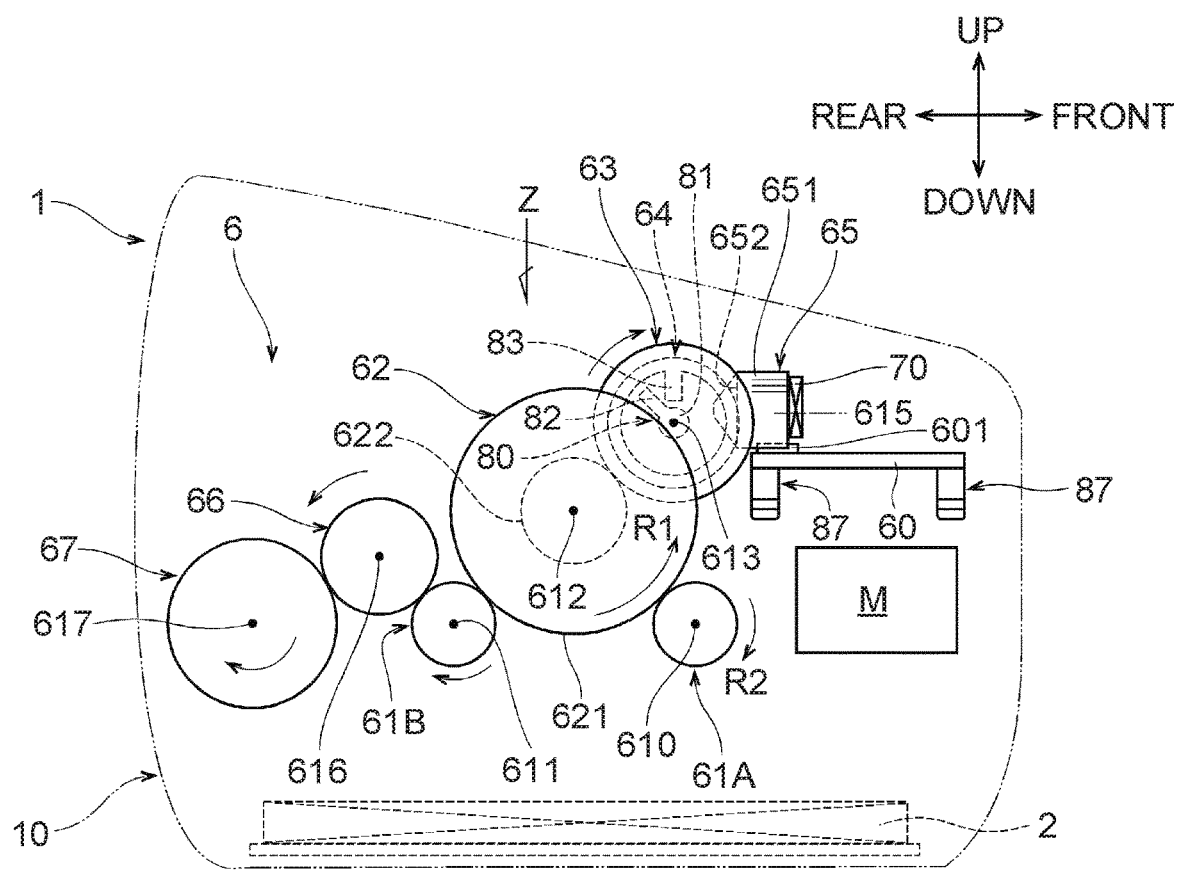
FIG. 5 is a schematic cross-sectional view, taken along line C-C of the image reading apparatus in FIG. 2 according to the first embodiment, showing a positioning mechanism with a first gear rotating in a second rotation direction.
Figure 6:
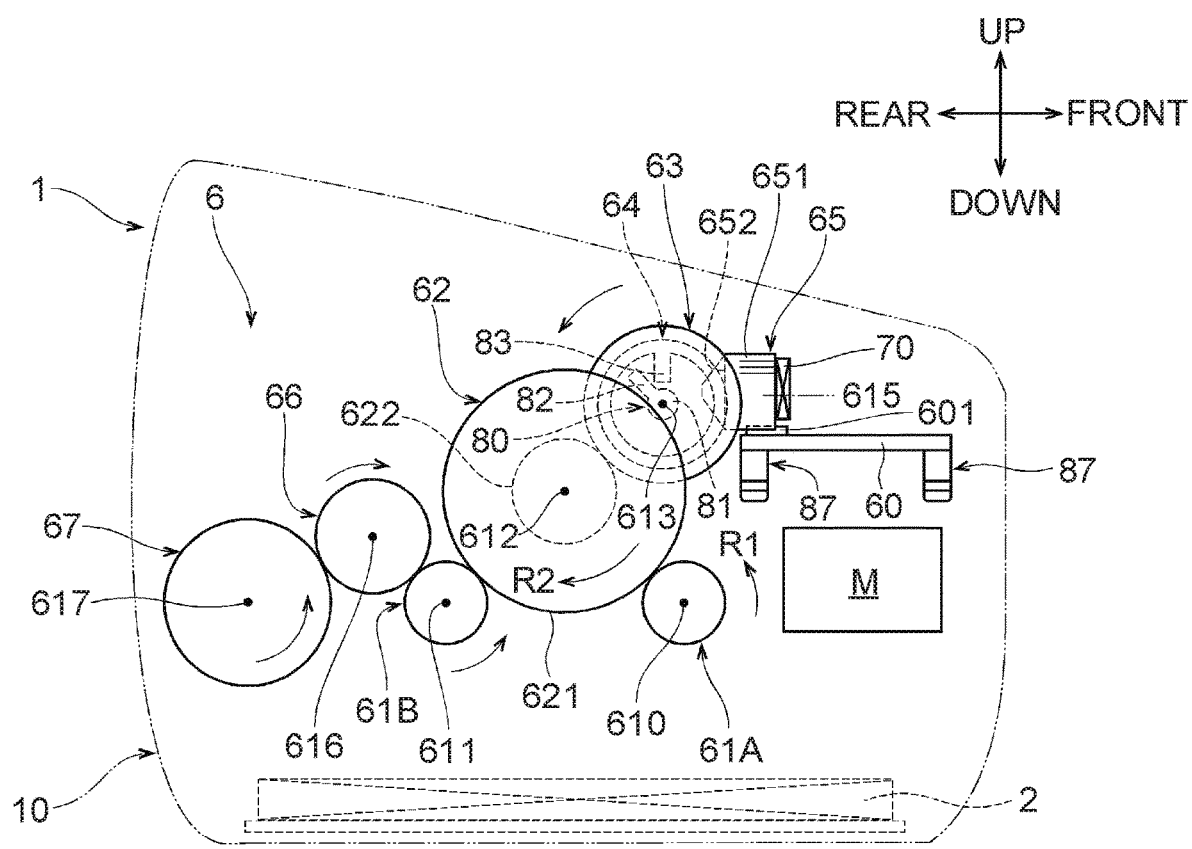
FIG. 6 is a schematic cross-sectional view, taken along line C-C of the image reading apparatus in FIG. 2 according to the first embodiment, showing the positioning mechanism with the first gear rotating in a first rotation direction.

As shown in FIGS. 2, 5 and 6, the motor M is disposed in the housing 10 at a position between a left side surface of the housing 10 and the transport guide 20. The position of the motor M may be changed as required. For ease of explanation, the shape of the motor M is shown schematically in FIGS. 2, 5 and 6. The feed tray 30 in the open position is omitted from FIGS. 5 and 6.

As shown in FIG. 3, the separation roller 48 is disposed in the housing 10 and rotatably supported by an inner frame (not shown). An upper portion of a circumferential surface of the separation roller 48 is exposed to the first guide 21 from a transport surface of the lower chute 26. The separation roller 48 is disposed at a central portion of the first guide 21 in the left-right direction. As shown in FIG. 2, the separation roller 48 is fixed to a rotation shaft 40A.

As shown in FIG. 3, the separation pad 49 is disposed in the housing 10. The separation pad 49 is exposed to the first guide 21 from the guide surface 25G of the upper chute 25 and pressed against the separation roller 48. The separation pad 49 is a plate made of a frictional material such as rubber or elastomer.

As shown in FIGS. 2-4, the first roller transport pairs 41A, 41B, 41D are disposed in the housing 10. Each of the first transport roller pairs 41A, 41B, 41D includes a drive roller rotationally driven by the motor M and a driven roller facing down the drive roller. The drive rollers are fixed to a rotation shaft 40B. The first transport roller pairs 41A, 41B, 41D are disposed at a rear end of the second guide 22. The first transport roller pair 41D at a rightmost position is disposed at a right portion of the second guide 22.

The second transport roller pairs 42A, 42B, 42C, 42D are disposed in the housing 10. Each of the second transport roller pairs 42A, 42B, 42D, 42D includes a drive roller rotationally driven by the motor M and a driven roller facing down the drive roller. The drive rollers are fixed to a rotation shaft 40C. The second transport roller pairs 42A, 42B, 42C, 42D are disposed at a front end of the second guide 22. The second transport roller pair 42D at a rightmost position is disposed at a right portion of the second guide 22.

The separation roller 48, the first transport roller pairs 41A, 41B, 41D and the second transport roller pairs 42A-42D are rotationally driven by the motor M to transport a card CA, in the housing 10, in a first transport direction P1 as shown in FIG. 4 and transport a sheet SH and a card CA in a second transport direction P2 as shown in FIGS. 3 and 4. The first transport direction P1 is a direction in which the card CA is transported rearward in the housing 10. The second transport direction P2 is a direction in which the sheet SH and the card CA are transported frontward in the housing 10.

The first reader 51 includes the above-described first reader holder 55 and the first reading sensor 51S held by the first reader holder 55. The second reader 52 includes the above-described second reader holder 56 and the second reading sensor 52S held by the second reader holder 56. A known image reading sensor such as a contact image sensor (CIS) may be used for the first reading sensor 51S and the second reading sensor 52S.

The first reading sensor 51 is supported at a position above the second guide 22. The first reading sensor 51S of the first reader 51 reads an image on an upper side of the sheet SH and an image on an upper side of the card CA. The upper side of the sheet SH and the upper side of the card CA each are an example of a first side.

The second reading sensor 52 is supported at a position below the second guide 22. The second reading sensor 52S of the second reader 52 reads an image on a lower side of the sheet SH and an image on a lower side of the card CA. The lower side of the sheet SH and the lower side of the card CA each are an example of a second side.

As shown in FIGS. 3 and 4, the second reader holder 56 of the second reader 52 is immovably supported by the lower frame 27. In contrast, the first reader holder 55 of the first reader 51 is supported by a frame (not shown) so as to be movable vertically.

Positioning Mechanism

Figure 7:
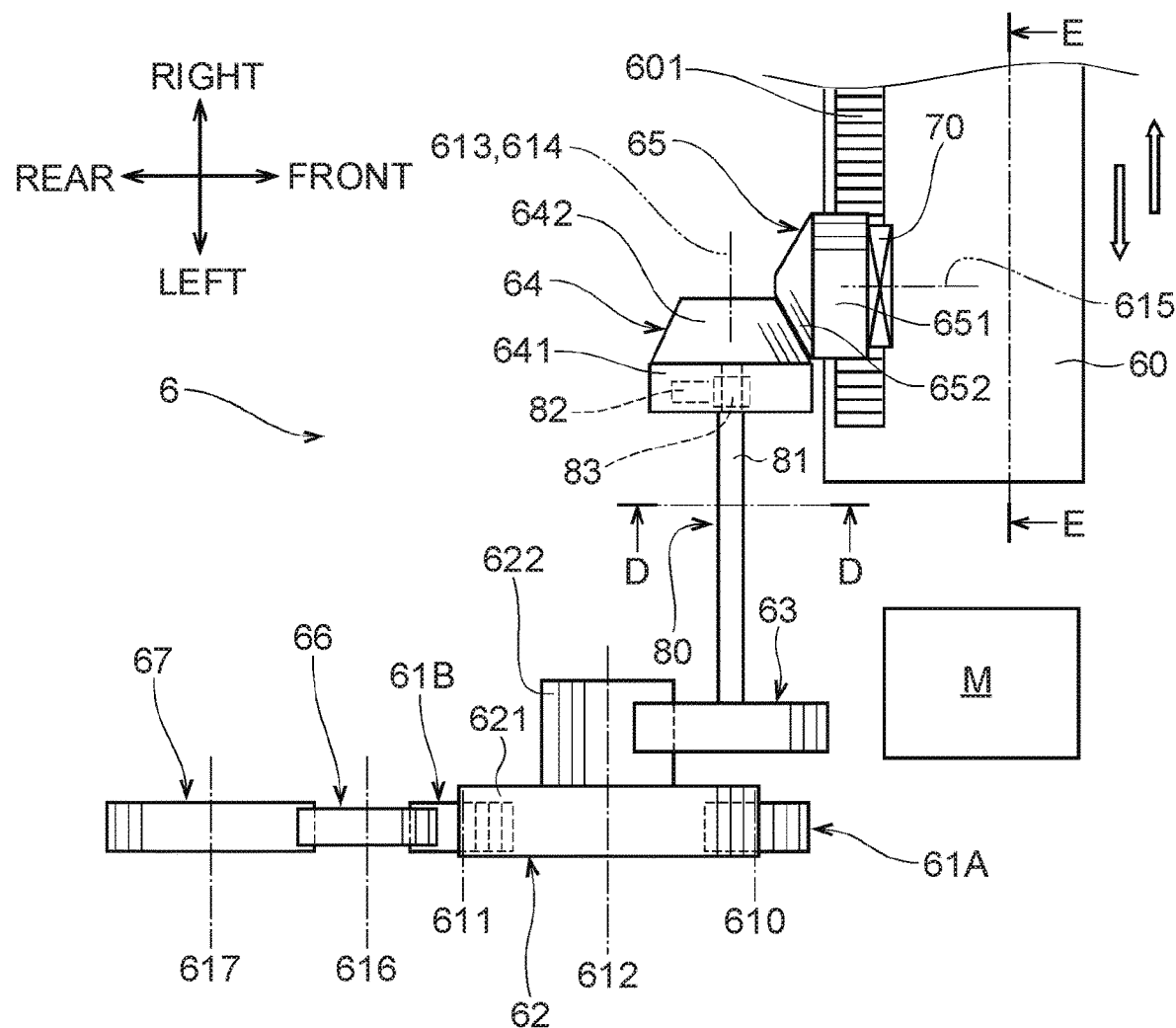
FIG. 7 is a schematic top view, viewed from Z of FIG. 5, showing the positioning mechanism including gears.

The positioning mechanism 6 includes a changeover member 60 shown in FIGS. 2-7 and 9, a first gear 61A, a second gear 62, a third gear 63, a fourth gear 64, a fifth gear 65, a sixth gear 66, a seventh gear 67, and a torque limiter 70 which are shown in FIGS. 5-7. For ease of explanation, the shapes of the first gear 61A and other gears are shown schematically in FIGS. 5 and 6.

Changeover Member

As shown in FIGS. 2-4, the changeover member 60 is a substantially rectangular flat plate extending in the left-right direction and in a front-rear direction. The changeover member 60 is disposed in the housing 10 at a position above the first reader 51. As shown in FIGS. 7 and 9, the changeover member 60 is supported by a frame (not shown) reciprocably in the left-right direction. Thus, the changeover member 60 is movable between a first changeover position and a second changeover position. A rack gear 601 is integrally formed with the changeover member 60. The rack gear 601 is disposed at a left end portion of the changeover member 60 and extends by a predetermined length in the left-right direction.

First and Second Changeover Positions

Figure 9A:
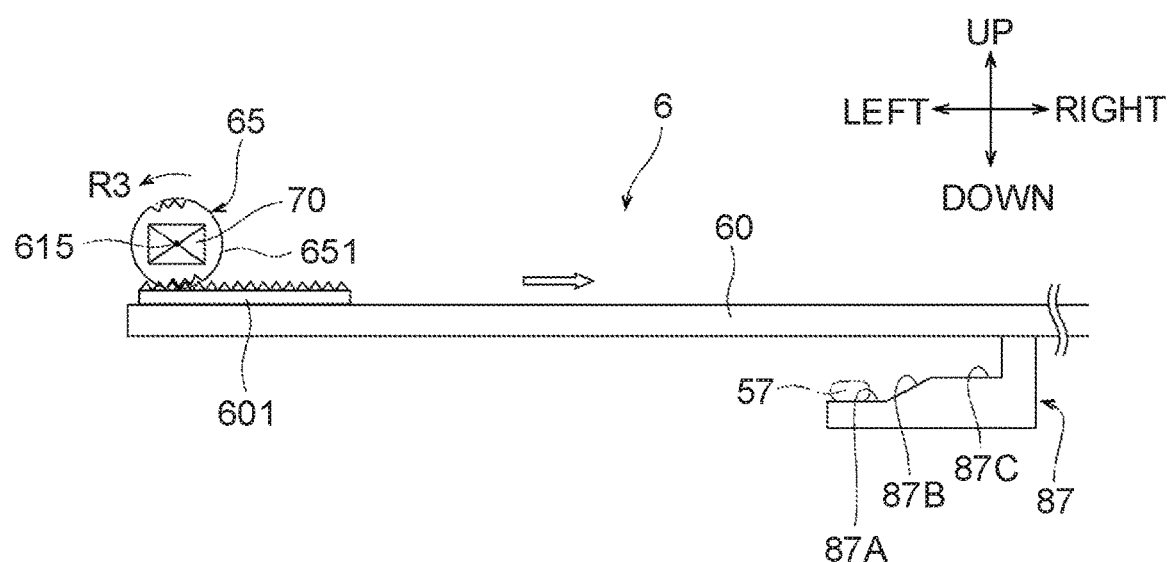
FIG. 9A is a schematic cross-sectional view, taken along line E-E of FIG. 7, showing a changeover member which has moved the first reader to the first position.

The changeover member 60 shown in FIG. 9A has moved to a rightmost position in the housing 10. This position of the changeover member 10 is referred to as the first changeover position. The changeover member 60 shown in FIG. 9B has moved to a leftmost position in the housing 10. This position of the changeover member 10 is referred to as the second changeover position. The changeover member 60 moves between the first changeover position and the second changeover position, thereby causing the first reader 51 to move between a first position shown in FIG. 3 and a second position shown in FIG. 4.

First Position

As shown in FIG. 3, when the first reader 51 is at the first position, a gap, i.e., a distance, W1 is defined between the guide surface 55G of the first reader holder 55 and the transport surface 56G of the second reader holder 56. The gap W1 corresponds to the standard thickness of a sheet SH.

Second Position

As shown in FIG. 4, when the first reader 51 is at the second position, a gap, i.e., a distance, W2 is defined between the guide surface 55G of the first reader holder 55 and the transport surface 56G of the second reader holder 56. The gap W2 corresponds to, i.e., is substantially equal to, the standard thickness of a card CA and is greater than the gap W1. The first reader 51 when at the second position is higher in the housing 10 than when at the first position.

Structure for Moving First Reader between First Position and Second Position

A compressed coil spring 51T is disposed between an upper surface of the first reading sensor 51S of the first reader 51 and a frame (not shown). The compressed coil spring 51T urges down the first reader 51 toward the first position.

As shown at least in FIGS. 2 and 3, the first reader holder 55 includes four transmission shafts 57. Two of the transmission shafts 57 protrude frontward from an upper end of a front surface of the first reader holder 55 and are apart from each other in the left-right direction. The other two of the transmission shafts 57 protrude from an upper end of a rear surface of the first reader holder 55 and are apart from each other in the left-right direction.

As shown in at least in FIGS. 2, 3 and 9, the changeover member 60 includes four linear cams 87. The linear cams 87 are positioned in a one-to-one correspondence with the transmission shafts 57 of the first reader holder 55 such that each transmission shaft 57, which is served as a cam follower, is slidably supported by the corresponding linear cam 87. The linear cams 87 are connected to a lower surface of the changeover member 60. Each linear cam 87 extends downward from the lower surface of the changeover member 60 and then bends leftward.

As shown in FIGS. 6 and 9, each linear cam 87 includes a first support surface 87A, a slope 87B, and a second support surface 87C. The first support surface 87A is a flat surface extending substantially horizontally. The second support surface 87C is a flat surface apart upward and rightward from the first surface 87A and extending substantially horizontally. The slope 87B connects a right end of the first support surface 87A and a left end of the second support surface 87C. A difference in height between the first support surface 87A and the second support surface 87C is set to be equal to a value obtained by subtracting the gap W1 from the gap W2.

When the changeover member 60 is located in the first switchover position shown in FIG. 9A, each transmission shaft 57 of the first reader holder 55 is supported by the first support surface 87A of the corresponding linear cam 87, thereby being positioned vertically. Thus, the changeover member 60, when located at the first changeover position, positions the first reader 51 at the first position shown in FIG. 3. In this embodiment, the first position is an initial position.

When the changeover member 60 starts moving leftward from the first changeover position, each transmission shaft 57 of the first reader holder 55 is raised by the slope 87B of the corresponding linear cam 87. When the changeover member 60 moves to the second changeover position shown in FIG. 9B, each transmission shaft 57 is supported by the second support surface 87C of the corresponding linear cam 87, thereby being positioned vertically. Thus, the changeover member 60, when located at the second changeover position, positions the first reader 51 at the second position shown in FIG. 4.

First to Seventh Gears

As shown in FIGS. 5 and 6, first to seventh gears 61A, 61B, 62-67 are disposed in the housing 10 at a position between the left side surface of the housing 10 and the transport guide 20. The first gear 61A is connected to the motor M to transmit a drive force from the motor M. The first gear 61A is rotatable about a rotation axis 610 in a first rotation direction R1 shown in FIG. 6 and in a second rotation direction R2 shown in FIG. 5. As shown in FIG. 7, the rotation axis 610 is parallel to rotation axes 611-614, 616, 617 to be described later and extends in the left-right direction in the housing 10. A rotation shaft 40C shown in FIG. 2 is fixed to the first gear 61A.

The first rotation direction R1 is counterclockwise in FIGS. 5 and 6. The second rotation direction R2 is opposite to the first rotation direction R1 and clockwise in FIGS. 5 and 6.

The first gear 61B is disposed behind the first gear 61A and is rotatable about a rotation axis 611 in the first rotation direction R1 shown in FIG. 6 and in the second rotation direction R2 shown in FIG. 5. A rotation shaft 40B shown in FIG. 2 is fixed to the first gear 61B.

As shown in FIG. 7, the second gear 62 is disposed between the first gear 61A and the first gear 61B. The second gear 62 includes a gear portions 621, and a gear portion 622 coaxial with and extending rightward from the gear portion 621. The gear portion 622 has a smaller diameter than the gear portion 621. The gear portion 621 is in mesh with the first gear 61A and the first gear 61B. The second gear 62, to which rotation of the first gear 61A is transmitted, is rotatable about the rotation axis 612 in the first rotation direction R1 shown in FIG. 5 and in the second rotation direction R2 shown in FIG. 6. The second gear 62 transmits, via the gear portion 621, rotation of the first gear 61A to the first gear 61B.

As shown in FIG. 7, the third gear 63 is in mesh with a gear portion 622 of the second gear 61, and rotation of the second gear 62 is transmitted to the third gear 63. Thus, the third gear 63 is rotatable about the rotation axis 613 in the first rotation direction R1 shown in FIG. 6 and in the second rotation direction R2 shown in FIG. 5.

As shown in FIG. 7, a transmission portion 80 is formed integrally with the third gear 63. The transmission portion 80 includes a transmission shaft 81 and a transmission protrusion 82. The transmission shaft 81 has a left end formed integrally with the third gear 63 and extends rightward. The transmission protrusion 82 is formed integrally with a right end of the transmission shaft 81. The transmission portion 80 rotates in the first rotation direction R1 and in the second rotation direction R2, together with the third gear 63 rotating in the first rotation direction R1 and in the second rotation direction R2.

Figure 8:
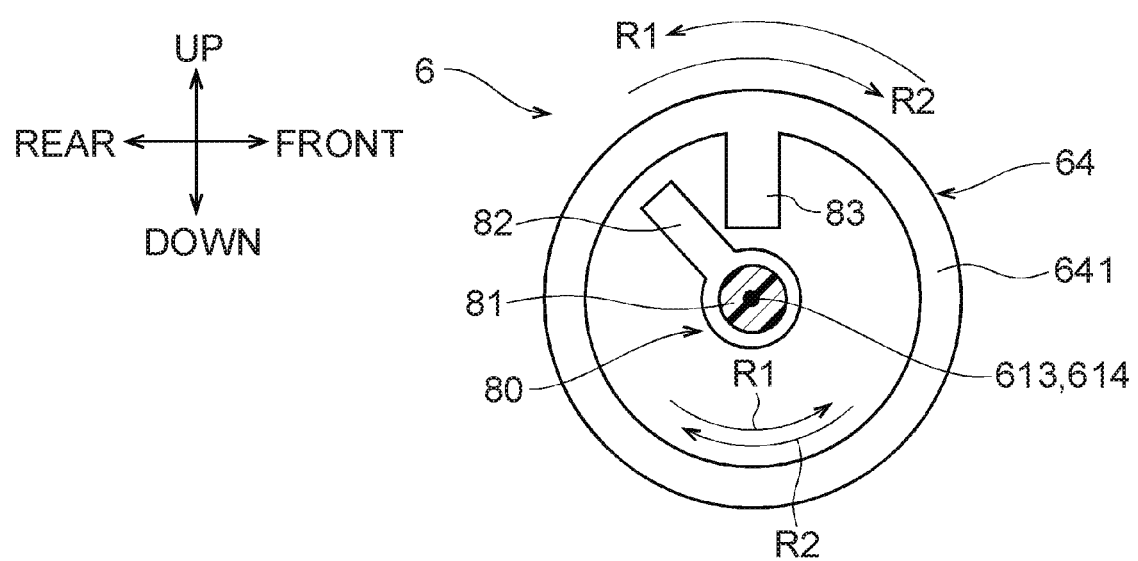
FIG. 8 is a schematic cross-sectional view, taken along line D-D of FIG. 7, showing a transmission portion and a receiving portion.

The fourth gear 64 includes a cylindrical portion 641 and a gear portion 642. The fourth gear 64 is disposed to the right of the third gear 63 while the cylindrical portion 641 faces the third gear 63. As shown in FIG. 8, the cylindrical portion 641 stores therein the transmission shaft 81 and the transmission protrusion 82. A receiving portion 83 is formed integrally with the cylindrical portion 641. The receiving portion 83 protrudes toward the transmission protrusion 82 such that the transmission protrusion 82 is contactable with the transmission protrusion 82. As shown in FIG. 7, the gear portion 642 is formed integrally with a right end of the cylindrical portion 641 and tapered such that the diameter decreases rightward.

When the transmission protrusion 82 contacts the receiving portion 83 in the cylindrical portion 641, the transmission portion 80 transmits rotation of the third gear 63 to the fourth gear 64. Thus, the fourth gear 64 is rotatable about the rotation axis 614 shown in FIG. 7 in the first rotation direction R1 and in the second rotation direction R2 shown in FIG. 8.

Figure 9B:
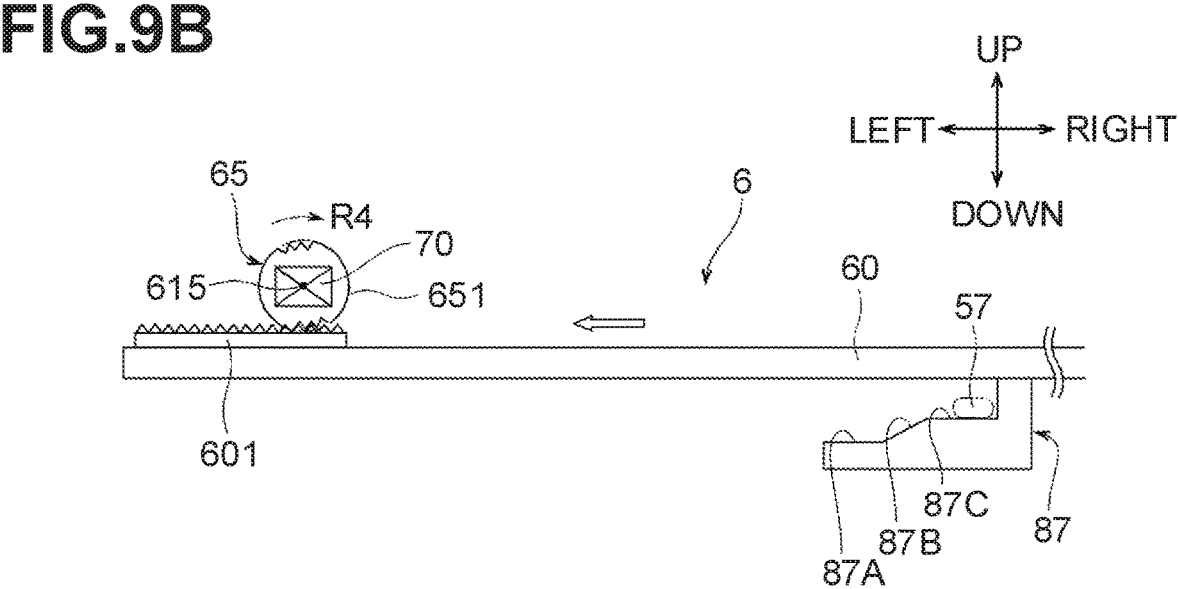
FIG. 9B is a schematic cross-sectional view, taken along line E-E of FIG. 7, showing the changeover member which has moved the first reader to the second position.

As shown in FIG. 7, the fifth gear 65 is disposed in front of the fourth gear 64. The fifth gear 65 includes a gear portion 651 and a gear portion 652. The gear portion 651 is cylindrical. The gear portion 652 is formed integrally with a rear end of the gear portion 651. The gear portion 652 is tapered such that the diameter decreases rearward. The gear portion 651 is in mesh with the rack gear 601. The gear portion 652 is in mesh with the gear portion 642 of the fourth gear 64. Thus, the fifth gear 65, to which rotation of the fourth gear 64 is transmitted, is rotatable about the rotation axis 615 in a third rotation direction R3 shown in FIG. 9A and in a fourth rotation direction R4 shown in FIG. 9B. As shown in FIG. 7, the rotation axis 615 extends in the front-rear direction in the housing 10 and is perpendicular to the rotation axis 610. Thus, the third rotation direction R3 and the fourth rotation axis R4 are perpendicular to the first rotation axis R1 and the second rotation axis R2. The fourth rotation direction R4 shown in FIG. 9B is opposite to the third rotation direction R3 shown in FIG. 9A.

The gear portion 651 of the fifth gear 65 transmits rotation of the fourth gear 64 to the rack gear 601. Thus, when the fifth gear 65 rotates in the third rotation direction R3 shown in FIG. 9A, the changeover member 60 moves rightward in the housing 10. When the fifth gear 65 rotates in the fourth rotation direction R4 shown in FIG. 9B, the changeover member 60 moves leftward in the housing 10. The changeover member 60 is configured to apply, via the rack gear 601, a larger load to the fifth gear 65 as the changeover member 60 moves further rightward or leftward in the housing 10.

As shown in FIGS. 5 and 6, the sixth gear 66 is in mesh with the first gear 61B. The sixth gear 66, to which rotation of the first gear 61B is transmitted, is rotatable about the rotation axis 616 in the first rotation direction R1 shown in FIG. 5 and in the second rotation direction R2 shown in FIG. 6.

The seventh gear 67 is in mesh with the sixth gear 66. Thus, the seventh gear 67, to which rotation of the sixth gear 66 is transmitted, is rotatable about the rotation axis 617 in the first rotation direction R1 shown in FIG. 6 and in the second rotation direction R2 shown in FIG. 5. The seventh gear 67 is fixed to the rotation axis 40A shown in FIG. 2.

Torque Limiter

As shown in FIGS. 5 and 6, a torque limiter 70 is disposed at the fifth gear 65. The torque limiter 70 is an example of a stopper. A predetermined load is set for the torque limiter 70. When a load applied by the changeover member 60 to the fifth gear 65 reaches the predetermined load, the torque limiter 70 blocks transmission of rotation of the fourth gear 64 to the fifth gear 65. Alternatively, the torque limiter 70 may be disposed at the third gear 63.

Reading Image of Card

Figure 10:
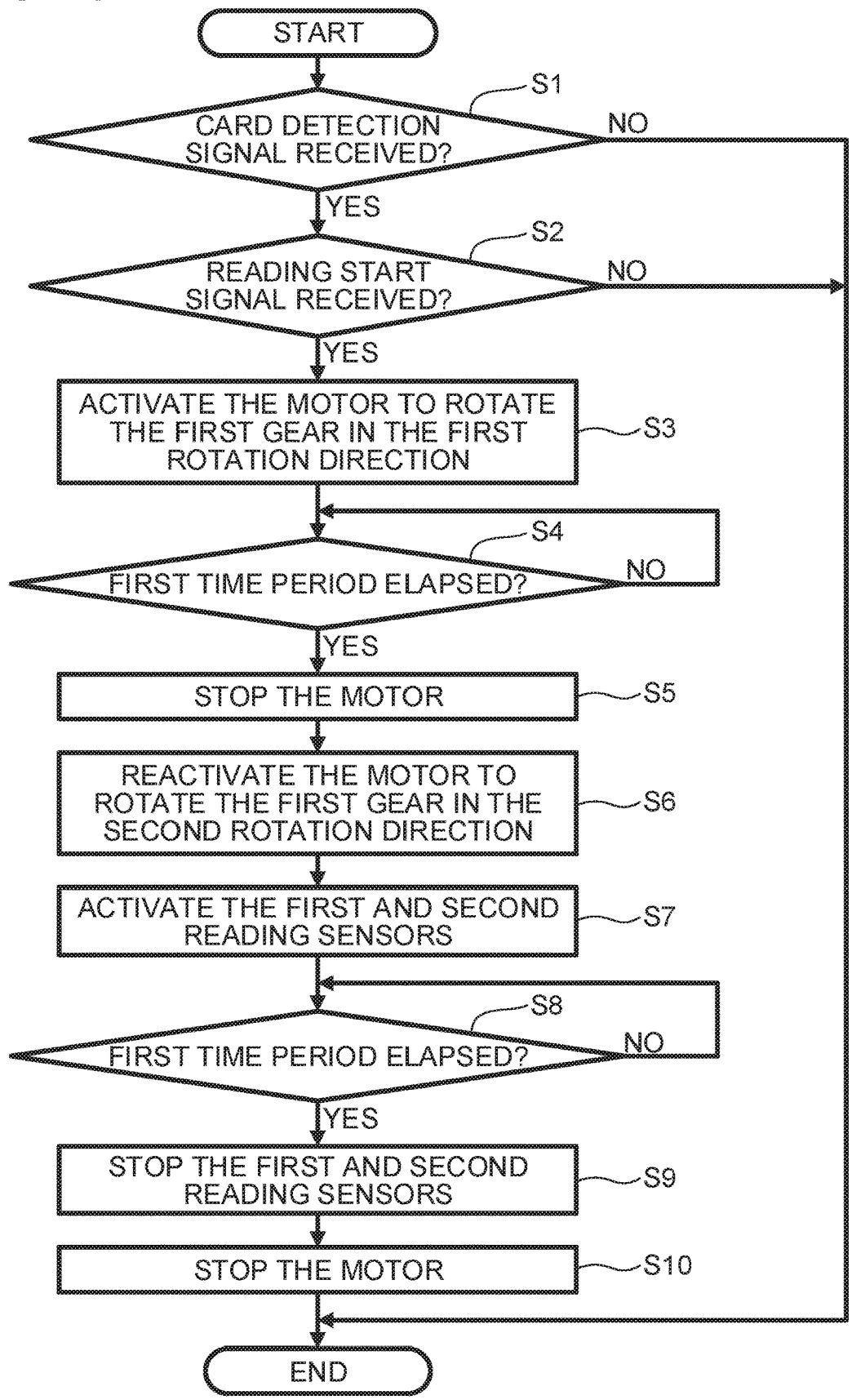
FIG. 10 is a flowchart showing a process executed by a controller for the image reading apparatus according to the first embodiment to read first and second sides of a second medium.

For reading images on upper and lower sides of a card CA in the image reading apparatus 1 in the first embodiment, a user inserts a portion of the card CA into the second inlet 12. In this case, the first reader 51 is located at the first position shown in FIG. 3, which is the initial position for the first reader 51 as described above, and the changeover member 60 is located at the first changeover position. When the user presses down the start button 100 shown in FIG. 1, the controller 2 controls the motor M and the first and second reading sensors 51S, 52S based on a control flow shown in FIG. 10.

Specifically, when the controller 2 receives a card detection signal from the card sensor 102 (step S1: YES) and a reading start signal from the start button 100 (step S2: YES), the controller activates the motor M shown in FIG. 6 to rotate in the first rotation direction R1 (step S3 in FIG. 10).

The first gear 61A rotates in the first rotation direction R1. The second gear 62 rotates in the second rotation direction R2 to transmit a drive force of the motor M to the first gear 61B, which in turn rotates in the first rotation direction R1. The second gear 62, the first gear 61B, and the sixth gear 66 transmit the drive force of the motor M to the seventh gear 67, which in turn rotates in the first rotation direction R1. Consequently, as shown in FIG. 4, the first transport roller pairs 41A, 41B, 41D, the second transport roller pairs 42A-42D, and the separation roller 48 are driven to rotate to transport the card CA in the first transport direction P1.

Thus, the feed unit 4 starts transporting the card CA. Specifically, the second transport roller pair 42D disposed rightmost nips the card CA and transports the card CA toward the first transport roller pair 41D. The card CA is transported toward the first and second readers 51, 52 in the first transport direction P1.

Figure 11:
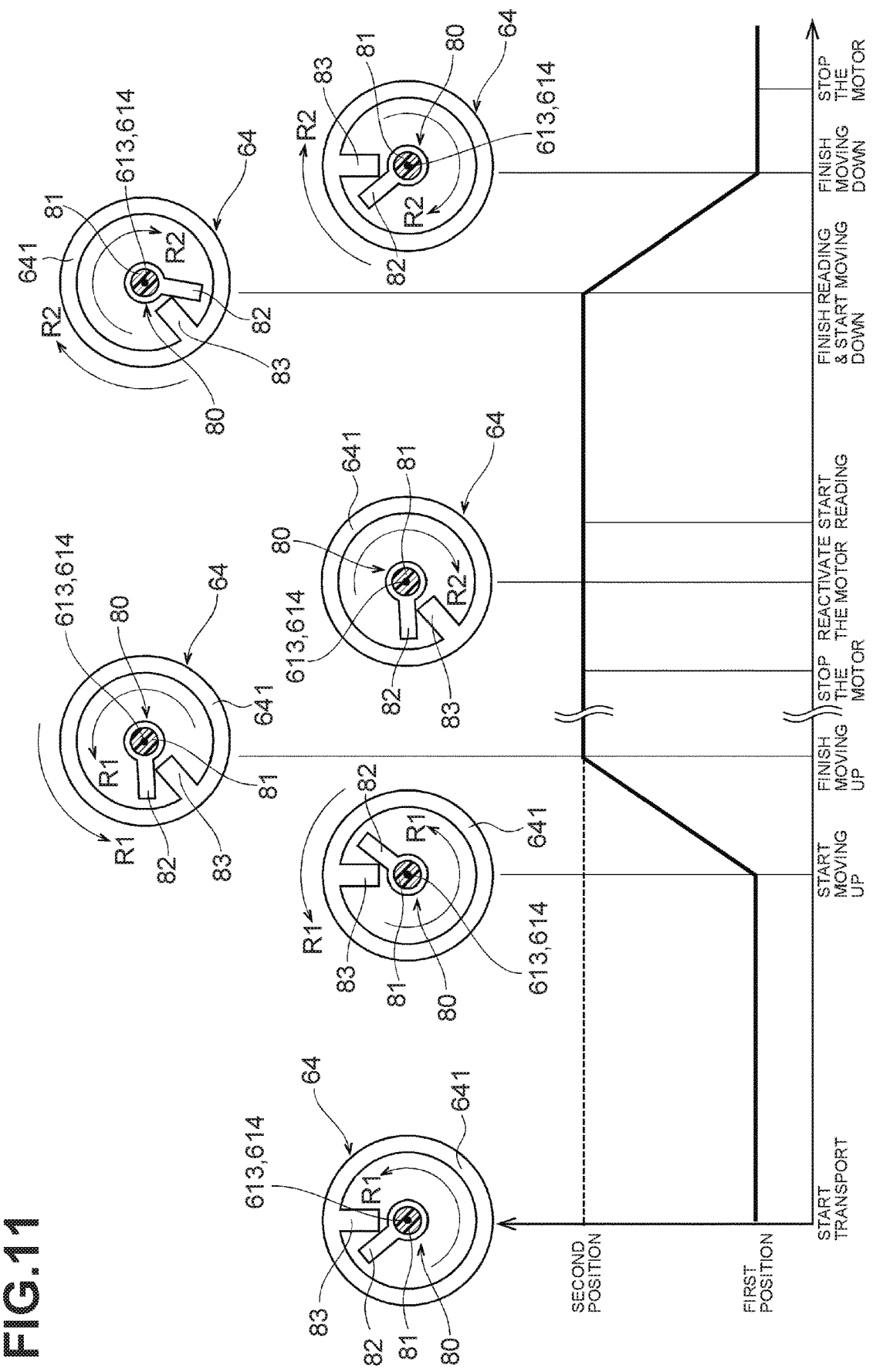
FIG. 11 is a timing chart showing when rotation of a third gear is transmitted and blocked to a fourth gear, and when the first reader moves between the first and second positions in the image reading apparatus according to the first embodiment.

As shown in FIG. 6, when the second gear 62 rotates in the second rotation direction R2, the third gear 63 rotates in the first rotation direction R1. Thus, as shown in FIG. 8, the transmission protrusion 82 of the transmission portion 80 of the third gear 63 rotates in the first rotation direction R1 in the cylindrical portion 641 of the fourth gear 64. When the first reader 51 is at the first position, the transmission protrusion 82 is required, as shown in FIG. 11, to make substantially one rotation in the first rotation direction R1 in the cylindrical portion 641 before contacting the receiving portion 83. In other words, there is a time lag between the start of rotation of the first gear 61A and other gears driven by the motor to transport the card CA and the start of transmission of rotation of the third gear 63 to the fourth gear 64. During this time lag, the fourth and fifth gears 64, 65 remain stopped. Thus, the first reader 51 remains at the first position before transmission of rotation of the third gear 63 to the fourth gear 64 is started.

When the transmission protrusion 82 rotating in the first rotation direction R1 contacts the receiving portion 83, rotation of the third gear 63 is transmitted, via the transmission portion 80 and the receiving portion 83, to the fourth gear 64. The fourth gear 64 rotates, together with the third gear 63, in the first rotation direction R1. Subsequently, as shown in FIG. 9B, the fifth gear 65 rotates in the fourth rotation direction R4. This allows for transmission of the drive force of the motor M to the changeover member 60 via the first to fifth gears 61A, 61B, 62-65 and the rack gear 601. The fifth gear 65 moves the changeover member 60 leftward from the first changeover position. Thus, as shown in FIG. 11, the first reader 51 at the first position starts moving up toward the second position in the housing 10. The fourth gear 64 continues to rotate in the first rotation direction R1, and the fifth gear 65 continues to rotate in the fourth rotation direction R4 until the first reader 51 moves up to the second position shown in FIG. 4. Finally, a gap between the guide surface 55G of the first reader holder 55 and the transport surface 56G of the second reader holder 56 becomes W2.

While the feed unit 4 uses the drive force of the motor M to transport the card CA in the first transport direction P1, the positioning mechanism 6 uses the drive force of the motor M to move the changeover member 60 to the second changeover position, thereby moving the first reader 51 to the second position. The movement of the first reader 51 from the first position to the second position is completed before a leading edge of the card CA transported by the second transport roller pair 42D reaches the first reader 51 in the first transport direction P1.

As shown in FIG. 9B, upon completion of movement of the first reader 51 to the second position, a load applied by the changeover member 60 to the fifth gear 65 reaches the predetermined load for the torque limiter 70. The torque limiter 70 blocks transmission of rotation from the fourth gear 64 to the fifth gear 65. Thus, after the first reader 51 moves to the second position, the fourth gear 64 rotating in the first rotation direction R1 will not cause the fifth gear 65 to rotate in the fourth rotation direction R4. This will not allow for transmission of the drive force of the motor M to the changeover member 60, causing the changeover member 60 to stop and the first reader 51 to stop at the second position.

The controller 2 continues to drive the motor M until elapse of a predetermined first time period since the card sensor 102 detects a leading edge of the card CA, even after the first reader 51 moves to the second position (step S4: NO in FIG. 10). The first time period is a time period necessary from the start of transport of the card CA till the exposure of the card CA from the switchback opening 14 to the exterior of the housing 14.

Thus, the card CA passes in the first transport direction P1 between the first reader 51 and the second reader 52, i.e., between the guide surface 55G and the transport surface 56G. The first transport roller pair 41D nips the card CA having passed between the guide surface 55G and the transport surface 56G and transports the card CA toward the switchback guide 24. The first roller pair 41D exposes a rear end of the card CA from the switchback opening 14 to the exterior of the housing 10 while nipping the card CA. When the rear end of the card CA is exposed from the switchback opening 14 to the exterior of the housing 10, an entirety of the card CA transported by the feed unit 4 in the first transport direction P1 has passed the first and second readers 51, 52.

The controller 2 stops the motor M (step S5 in FIG. 10) upon elapse of the first time period (step S4: YES). Then, the controller 2 reactivates the motor M such that the first gear 61A rotates in the second rotation direction R2, as shown in FIG. 5 (step S6 in FIG. 10).

The first gear 61A rotates in the second rotation direction R2. The second gear 62 rotates in the first rotation direction R1 and transmits the drive force of the motor M to the first gear 61B, which in turn rotates in the second rotation direction R2. The seventh gear 67 also rotates in the second rotation direction R2. Consequently, the first transport roller pairs 41A, 41B, 41D, the second transport roller pairs 42A-42D, and the separation roller 48 are driven to rotate to transport the card CA in the second transport direction P2.

The first transport roller pair 41D transports the card CA transported to the switchback guide 24 toward the second transport roller pair 42D. The card CA is transported toward the first and second readers 51, 52 in the second transport direction P2.

As shown in FIG. 5, when the second gear 62 rotates in the first rotation direction R1, the third gear 63 rotates in the second rotation direction R2. Thus, as shown in FIG. 8, the transmission protrusion 82 of the transmission portion 80 rotates in the second rotation direction R2 in the cylindrical portion 641 of the fourth gear 64. When the first reader 51 is at the second position, the transmission protrusion 82 is required to make substantially one rotation in the second rotation direction R2 in the cylindrical portion 641 before contacting the receiving portion 83. During such rotation of the transmission protrusion 82, rotation of the third gear 63 is not transmitted to the fourth gear 64 and thus the fourth and fifth gears 64, 65 will not rotate. Thus, the first reader 51 remains at the second position.

As shown in FIG. 4, while the first reader 51 remains at the second position without transmission of rotation of the third gear 63 to the fourth gear 64, the card CA passes between the guide surface 55G and the transport surface 56G in the second transport direction P2. In this case, the controller 2 activates the first and second reading sensors 51S, 52S to read images on the upper and lower sides of the card CA (step S7 in FIG. 10). The first reader 51 located at the second position allows the first reading sensor 51S to read an image on the upper surface of the card CA at a position corresponding to the thickness of the card CA.

The controller 2 continues to activate the motor M until the above-described first time period has elapsed (step S8: NO in FIG. 10). This allows the entirety of the card CA to have passed between the guide surface 55G and the transport surface 56G. As shown in FIG. 11, when the transmission protrusion 82 contacts the receiving portion 83, rotation of the third gear 63 is transmitted, via the transmission portion 80 and the receiving portion 83, to the fourth gear 64. The fourth gear 64 rotates, together with the third gear 63, in the second rotation direction R2. Subsequently, as shown in FIG. 9A, the fifth gear 65 rotates in the third rotation direction R3. When the card CA is transported in the second transport direction P2 as well, the drive force of the motor M is transmitted, in the positioning mechanism 6, to the changeover member 60 via the first to fifth gears 61A, 61B, 62-65 and the rack gear 601. The fifth gear 65 moves the changeover member 20 rightward from the second changeover position. Thus, as shown in FIG. 11, the first reader 51 at the second position starts moving down toward the first position in the housing 10. The fourth gear 64 continues to rotate in the second rotation direction R2, and the fifth gear 65 continues to rotate in the third rotation direction R3 until the first reader 51 moves down to the first position shown in FIG. 3. Finally, a gap between the guide surface 55G and the transport surface 56G becomes W1.

While the feed unit 4 uses the drive force of the motor M to transport the card CA, the positioning mechanism 6 uses the drive force of the motor M to move the changeover member 60 to the first changeover position and thereby to move the first reader 51 to the first position. The first reader 51 is moved from the second position to the first position after the entirety of the card CA, which has undergone both-side image reading by the first and second reading sensors 51S, 52S and is transported by the feed unit 4 in the second transport direction P2, passes the guide surface 55G and the transport surface 56G.

As shown in FIG. 9A, upon completion of the movement to the first reader 51 to the second position, a load applied by the changeover member 60 to the fifth gear 65 reaches the predetermined load for the torque limiter 70. The torque limiter 70 blocks transmission of rotation from the fourth gear 64 to the fifth gear 65. This causes the changeover member 60 to stop and the first reader 51 to stop at the first position.

As shown in FIG. 4, the card CA having passed between the guide surface 55G and the transport surface 56G is discharged from the outlet 13 while being nipped by the second transport roller pair 42D. When the first time period has elapsed since the reactivation of the motor M (step S8: YES in FIG. 10), the controller 2 stops the first and second reading sensors 51S, 52S (step S9) and then the motor M (step S10), thereby completing image reading of the upper and lower sides of the card CA.

Reading Image of Sheet

For reading images on upper and lower sides of a sheet SH in the image reading apparatus 1 in the first embodiment, a user moves the feed tray 30 to the open position shown in FIGS. 1 and 3 and places one or more sheets SH to be read on the feed tray 20. In this state, the user presses down the start button shown in FIG. 1. In this case also, the first reader 51 is located at the first position as the initial position.

When the controller 2 receives a sheet detection signal from the sheet sensor 101 and a reading start signal from the start button 100, the controller activates the motor M shown in FIG. 5 such that the first gear 61 rotates in the second rotation direction R2. As shown in FIG. 4, the first transport roller pairs 41A, 41B, 41D, the second transport roller pairs 42A-42D, and the separation roller 48 are driven to rotate to transport the sheets SH in the second transport direction R2.

The separation roller 48 transports a sheet SH inserted into the first inlet 11 along the first guide 21 toward the second guide 22. When a plurality of sheets SH are inserted into the first inlet 11, the separation roller 48 separates, in cooperation with the separation pad 49, the sheets SH one from another and transport the separated sheet toward the second guide 22. The first transport roller pairs 41A, 41B, 41D nip the sheet SH having reached the second guide 22 and transport further toward the first and second readers 51, 52 and the second transport roller pairs 42A-42D. The sheet SH is guided by the second guide 22 and passes between the guide surface 55G and the transport surface 56G in the second transport direction P2. In this case, the controller 2 activates the first and second reading sensors 51S, 52S to read images on the upper and lower sides of the card sheet SH. The first reader 51 located at the first position allows the first reading sensor 51S to read an image on the upper surface of the sheet SH at a position corresponding to the thickness of the sheet SH.

In the positioning mechanism 6, as shown in FIG. 5, the third gear 63 and the transmission portion 80 rotates in the second rotation direction R2 Immediately after the first gear 61A and other gears are driven by the motor M to rotate, the transmission protrusion 82 contacts the receiving portion 83, thereby transmitting rotation of the third gear 63 to the fourth gear 64, which in turn rotates in the second rotation direction R2. In this case, because the first reader 51 is already at the first position, the torque limiter 70 blocks transmission of rotation of the fourth gear 64 to the fifth gear 65. Thus, in the case of reading images on the upper and lower sides of the sheet SH, the first reader 51 remains stopped at the first position.

As shown in FIG. 3, the second transport roller pairs 42A-42D nip the sheet SH having passed between the guide surface 55G and the transport surface 56G and discharge the sheet SH from the outlet 13. When the controller 2 does not receive a sheet detection signal any more from the sheet sensor 101 and when a predetermined second time period has elapsed, the controller 2 stops the motor M and the first and second reading sensors 51S, 52S, thereby completing image reading of the upper and lower sides of the sheet SH. The second time period may be set as required and may be equal to or different from the first time period.

Effects

In the image reading apparatus 1 in the first embodiment, the positioning mechanism 6 moves the first reader 51 between the first position and the second position. This allows the first reader 51 to read, at the first position corresponding to a sheet SH, an image on the upper side of the sheet SH, and to read, at the second position corresponding to a card CA, an image on the card CA. Thus, the first and second reading sensors 51S, 52S of the first and second readers 51, 52 are allowed to read, at high accuracy, images on upper and lower sides of the sheet SH and the card CA.

For image reading on the upper and lower sides of the card CA, the positioning mechanism 6 uses the drive force of the motor M, which is used by the feed unit 4 to transport the card CA in the first transport direction P1, to move the first reader 51 from the first position to the second position. In the image reading apparatus 1, the first reader 51 is moved from the first position to the second position without any contact of the card CA transported in the second transport direction R2 with the first reader holder 55 of the first reader 51 or the guide surface 55G. Thus, the card CA is unlikely to skew in the housing 10 and is transported properly in the second transport direction P2.

When the first and second reading sensors 51S, 52S finish reading images on the upper and lower sides of the card CA, the positioning mechanism 6 moves the first reader 51 from the second position to the first position. The first reader 51 moves between the first and second positions without requesting the user to operate any switch.

When the entirety of the card CA has passed between the first and second readers 51, 52 after the first and second reading sensors 51S, 52S finish reading images on the upper and lower sides of the card CA, the positioning mechanism 6 moves the first reader 51 to the first position. This prevents the first reader 51, when moved from the second position to the first position, from contacting the card CA. This also prevents the first reader 51 from interfering with the card CA which has undergone image reading and is transported toward the outlet 13 in the second transport direction P2. Thus, the feed unit 4 transports the card CA properly in the second transport direction P2 after image reading.

The image reading apparatus 1 in the first embodiment includes the first reader 51 configured to read, at high accuracy, an image on the upper side of either the sheet SH or the card CA, and the second reader 52 configured to read, at high accuracy, an image on the lower side of either the sheet SH or the card CA. Thus, the image reading apparatus 1 provides improved convenience for users.

The positioning mechanism 6 effectively uses the drive force of the motor M, which is used by the feed unit 4 to transport the card CA in the second transport direction P2, to move the first reader 51 from the second position to the first position.

As shown in FIGS. 5-7, the positioning mechanism 6 includes the above-described changeover member 60, first to seventh gears 61A, 61B, 62-67, and torque limiter 70. The changeover mechanism 6, which is simplified in structure, readily moves the first reader 51 between the first position and the second position. The first reader 51 is effectively maintained at the second position by using a lag time for the transmission portion 80 and the receiving potion 83 to contact each other.

The torque limiter 70 is readily provided, as the stopper, for the fifth gear 65. The torque limiter 70 blocks transmission of rotation of the fourth gear 64 to the fifth gear 65 to effectively stop the first reader 51 at the first and second positions. The torque limiter 70 prevents the first reader 51 from moving up beyond the first position and moving down beyond the second position.

The transmission portion 80 is formed integrally with the third gear 63 and the receiving portion 83 is formed integrally with the fourth gear 64. This reduces the number of components of the positioning mechanism 6 and thus that of the image reading apparatus 1.

The image reading apparatus 1 includes the second reader 52 in addition to the first reader 51. The first reading sensor 51S of the first reader 51 and the second reading sensor 52S of the second sensor 52 read, at the same time, images on both sides of a sheet SH and a card CA. In this respect, the image reading apparatus 1 provides improved convenience for users.

Second Embodiment

Figure 12:
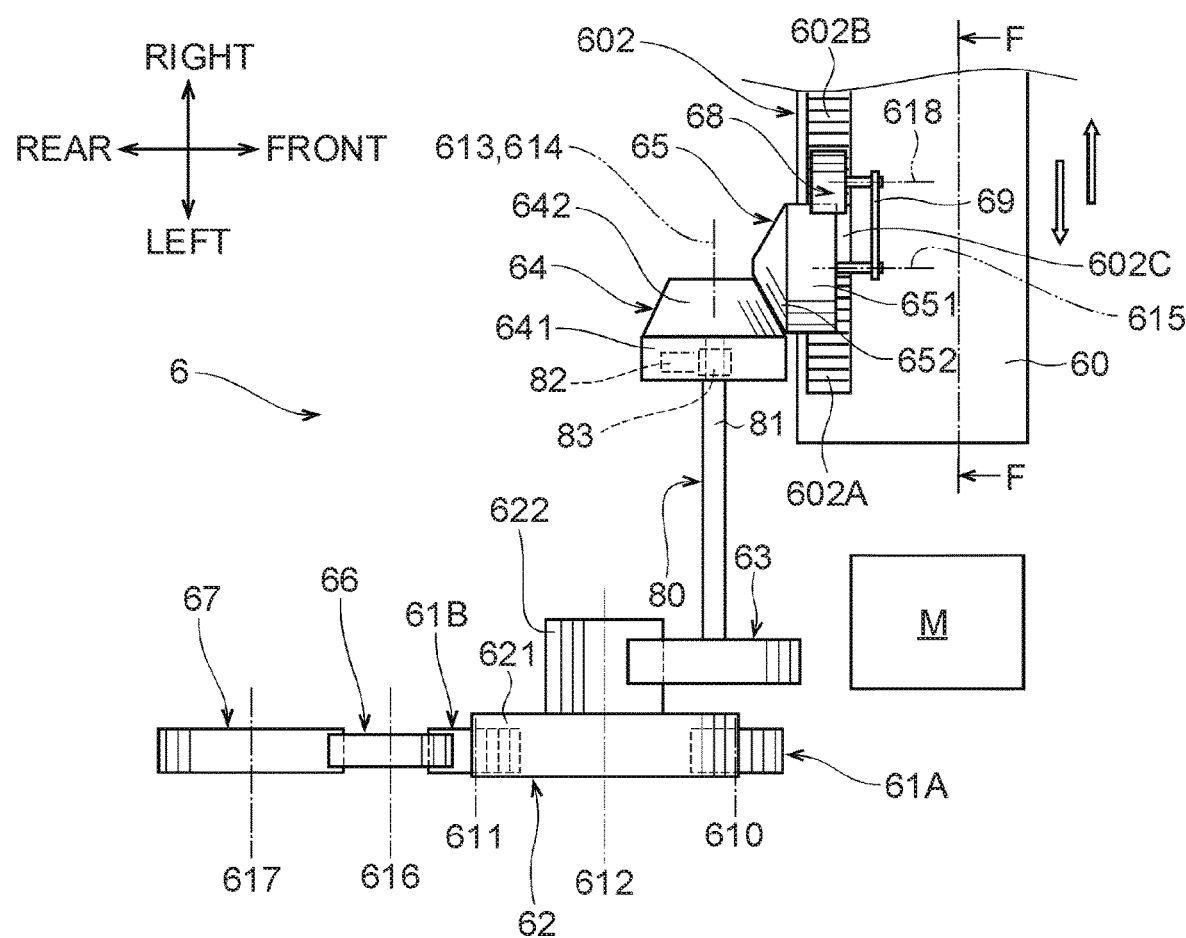
FIG. 12 is a schematic top view, similar to FIG. 7, of a positioning mechanism of an image reading apparatus according to a second embodiment.
Figure 13:
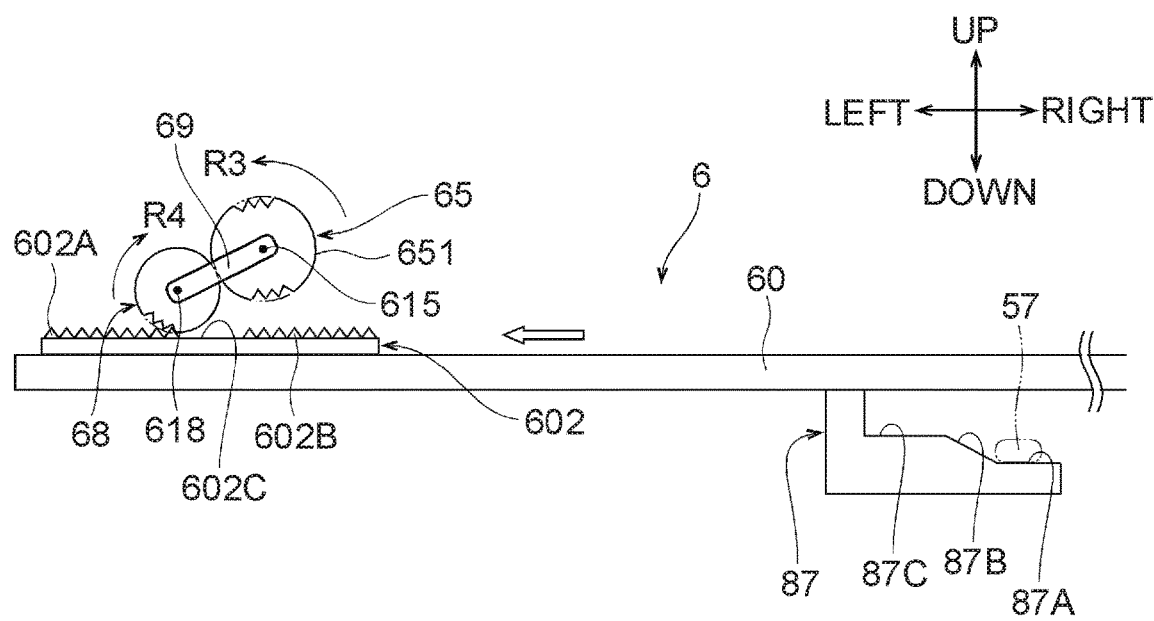
FIG. 13 is a schematic cross-sectional view, taken along line F-F of FIG. 12, showing a changeover member which has moved a first reader to a first position.
Figure 14:
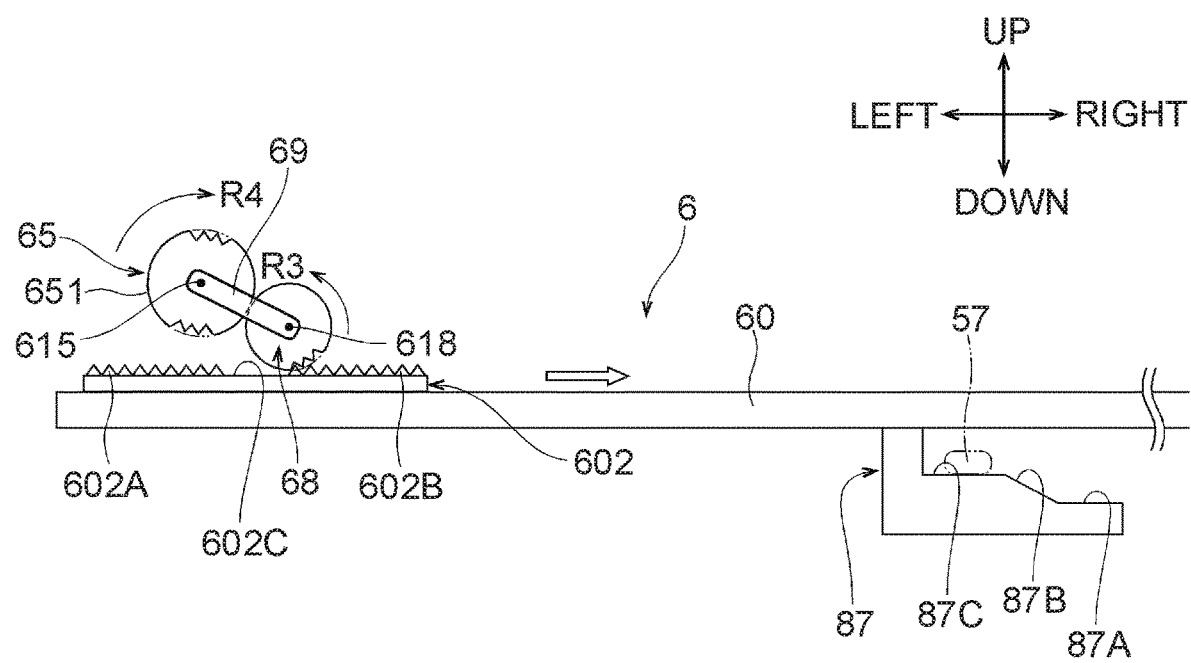
FIG. 14 is a schematic cross-sectional view, taken along line F-F of FIFG. 12, showing the changeover member which has moved the first reader to a second position.

As shown in FIGS. 12-14, in an image reading apparatus 1 in a second embodiment according to one or more aspects of the disclosure, a rack gear 602 is formed integrally with a changeover member 60. As shown in FIGS. 13 and 14, the rack gear 602 includes a first rack gear 602A disposed on the left, a second rack gear 602B disposed on the right, and a flat portion 602C disposed therebetween.

In this image reading apparatus 1, each linear cam 87 is connected to the changeover member 60 in an orientation reverse, in the left-right direction, to that in the first embodiment. In the second embodiment, as shown in FIG. 13, the changeover member 60 moves in a housing 10 to a leftmost position which is a first changeover position, thereby moving a first reader 51 to a first position. As shown in FIG. 14, the changeover member 60 moves in the housing 10 to a rightmost position which is a second changeover position, thereby moving the first reader 51 to a second position.

In the image reading apparatus 1, a planetary gear 68 and a planetary holder 69 are provided for a fifth gear 65. The planetary gear 68, the planetary holder 69, and the flat portion 602C of the rack gear 602 are an example of a stopper. The planetary gear 68 is in mesh with a gear portion 651 of the fifth gear 65 to receive rotation of the fifth gear 65. Thus, the planetary gear 68 rotates about a rotation axis 618 in a third rotation direction R3 shown in FIG. 14 and in a fourth rotation direction R4 shown in FIG. 13. As shown in FIG. 12, the rotation axis 618 extends parallel to a rotation axis 615 of the fifth gear 65.

The planetary gear 68 revolves around the gear 651 so as to mesh with the first rack gear portion 602A or the second rack gear portion 602B. The fifth gear 65 is in mesh with the rack gear 602 via the planetary gear 68 to transport rotation of a fourth gear 64 to the rack gear 602. The planetary holder 69 connects the fifth gear 65 and the planetary gear 68 such that the planetary gear 68 revolves around the gear portion 651. The other components in the second embodiment are the same as those described in the first embodiment. The same components are given the same reference numbers and will not be described repeatedly.

In this image reading apparatus 1, when the fourth gear 64 shown in FIG. 12 rotates in a first rotation direction R1, the fifth gear 65 rotates in the fourth rotation direction R4, as shown in FIG. 14. The planetary gear 68 rotates in the third rotation direction R3 and revolves around the gear portion 651 thereby to be located to the right of the fifth gear 65 and mesh with the second rack gear portion 602B. Thus, the fifth gear 65 moves, via the planetary gear 68 and the second rack gear portion 602B, the changeover member 60 rightward toward the second changeover position. When the changeover member 60 reaches the second changeover position and the first reader 51 reaches the second position, the planetary gear 68 faces the flat portion 602C of the rack gear 602 and rotates idly. Thus, the fifth gear 65 cannot move the changeover member 60 rightward any more, and the first reader 51 stops at the second position.

In contrast, when the fourth gear 64 shown in FIG. 12 rotates in a second rotation direction R2, the fifth gear 65 rotates in the third rotation direction R3, as shown in FIG. 13. The planetary gear 68 rotates in the fourth rotation direction R4 and revolves around the gear portion 651 thereby to be located to the left of the fifth gear 65 and mesh with the first rack gear portion 602A. Thus, the fifth gear 65 moves, via the planetary gear 68 and the first rack gear portion 602A, the changeover member 60 leftward toward the first changeover position. When the changeover member 60 reaches the first changeover position and the first reader 51 reaches the first position, the planetary gear 68 faces the flat portion 602C of the rack gear 602 and rotates idly. Thus, the fifth gear 65 cannot move the changeover member 60 leftward any more, and the first reader 51 stops at the first position. The other operations in the image reading apparatus 1 in the second embodiment are the same as those described in the second embodiment.

The disclosure has been described based on the first and second embodiments, but is not limited to these embodiments, and may be modified freely without departing from the spirit and scope of disclosure.

For example, the first gear 61B or the second gear 62 may be connected to the motor M to transmit a drive force from the motor M.

The positioning mechanism 6 may be configured such that after the first and second readers 51, 52 finish reading images on upper and lower sides of a card CA, the first reader 51 moves from the second position to the first position by its own weight or by urging force of an urging member.

Although, in the image reading apparatus 1, the right portion of the outlet 13 is served also as the second inlet 12, the second inlet 12 may be provided separately from the outlet 13.

What is claimed is:

1. An image reading apparatus comprising:
   a housing including:
     a first inlet into which a first medium is inserted;
     a second inlet which is disposed at a different position from the first inlet and into which a second medium different in thickness from the first medium is inserted; and
     a transport guide configured to guide the first medium and the second medium;
   a transport unit disposed in the housing and configured to transport the first medium and the second medium guided by the transport guide;
   a first reader disposed in the housing and configured to read an image on a first side of each of the first medium and the second medium;
   a controller disposed in the housing and configured to:
     control the transport unit to transport the second medium to and beyond the first reader in a first transport direction;
     after an entirety of the second medium has passed the first reader in the first transport direction, control the transport unit to transport the second medium to the first reader in a second transport direction opposite to the first transport direction; and
     control the first reader to read the image on the first side of the second medium being transported in the second transport direction; and
   a positioning mechanism disposed in the housing and configured to move the first reader between a first position corresponding to the first medium and a second position corresponding to the second medium;
   wherein the positioning mechanism is configured to:
     move the first reader from the first position to the second position by using a drive force by which the transport unit transports the second medium in the first transport direction; and
     maintain the first reader at the second position while the second medium transported by the transport unit in the second transport direction is passing the first reader; and
     move the first reader from the second position to the first position after the first reader reads the image on the first side of the second medium.

2. The image reading apparatus according to claim 1, wherein the positioning mechanism is configured to move the first reader from the second position to the first position when the entirety of the second medium has passed the first reader after the first reader reads the image on the first side of the second medium.

3. The image reading apparatus according to claim 1, wherein the positioning mechanism is configured to position the first reader from the second position to the first position by using a drive force by which the transport unit transports the second medium in the second transport direction.

4. The image reading apparatus according to claim 3, wherein the transport unit includes a motor and a transport roller to be driven by the motor, and
   wherein the positioning mechanism includes:
     a changeover member including a rack gear and supporting the first reader changeably between the first position and the second position;
     a first gear configured to rotate by the motor and drive the transport roller;
     a second gear in mesh with the first gear and rotatable in a first rotation direction and in a second rotation direction opposite to the first rotation direction;
     a third gear in mesh with the second gear and rotatable in the first rotation direction and in the second rotation direction;
     a fourth gear rotatable by the third gear in the first rotation direction and in the second rotation direction; and
     a fifth gear in mesh with the fourth gear and the rack gear and configured to cause the changeover member to move the first reader to the second position when the fourth gear rotates in the first rotation direction, and to cause the changeover member to move the first reader to the first position when the fourth gear rotates in the second rotation direction.

5. The image reading apparatus according to claim 4, wherein the third gear includes a transmission portion rotatable together with the third gear in the first rotation direction and in the second rotation direction, and the fourth gear includes a receiving portion to be contacted by the transmission portion,
   wherein the transmission portion is configured to:
   when the transmission portion rotates in the first rotation direction, contact the receiving portion to transmit rotation of the third gear to the fourth gear such that the fourth gear rotates in the first rotation direction;
   when the transmission portion rotates in the second rotation direction, contact the receiving portion to transmit rotation of the third gear to the fourth gear such that the fourth gear rotates in the second rotation direction; and
   when the transmission portion is out of contact with the receiving portion, suspend transmission of rotation of the third gear to the fourth gear.

6. The image reading apparatus according to claim 5, wherein the transmission portion is formed integrally with the third gear, and the receiving portion is formed integrally with the fourth gear.

7. The image reading apparatus according to claim 4, wherein the positioning mechanism includes a stopper configured to stop the first reader at the first position when the first reader reaches the first position, and to stop the first reader at the second position when the first reader reaches the second position.

8. The image reading apparatus according to claim 7, wherein the stopper includes a torque limiter disposed at the fifth gear, the torque limiter being configured to:
when the first reader moves to the first position, block transmission of rotation of the fourth gear to the fifth gear, and
when the first reader moves to the second position, block transmission of rotation of the fourth gear to the fifth gear.

9. The image reading apparatus according to claim 1, wherein the transport guide includes a transport surface, and the first reader includes a guide surface facing down the transport surface, and the transport unit is configured to transport the second medium between the transport surface and the guide surface in the first transport direction and in the second transport direction,
wherein the positioning mechanism is configured to move the first reader vertically relative to the transport surface between the first position and the second position such that a first gap defined between the transport surface and the guide surface of the first reader at the first position is less than a second gap defined between the transport surface and the guide surface of the first reader at the second position.

10. The image reading apparatus according to claim 1, further comprising a second reader configured to read an image on a second side of each of the first medium and the second medium.

11. The image reading apparatus according to claim 1, wherein the positioning mechanism includes:
a changeover member movable between a first changeover position and a second changeover position;
a cam connected to the changeover member; and
a cam follower connected to the first reader and slidably supported by the cam, and
wherein the first reader is moved between the first position and the second position by the cam follower sliding on the cam in response to the changeover member moving between the first changeover position and the second changeover position.

12. An image reading apparatus comprising:
a housing including:
a first inlet;
a second inlet disposed at a different position from the first inlet; and
a switchback opening;
a transport path extending substantially horizontally between the second inlet and the switchback opening;
a reader disposed along the transport path and configured to read an image on a card;
a sensor disposed adjacent to the second inlet;
a transport unit configured to transport the card along the transport path;
a positioning mechanism configured to move the reader between a first position and a second position;
a motor configured to supply a drive force to the transport unit and the positioning mechanism; and
a controller configured to:
in response to the sensor detecting the card at the first inlet, activate the motor such that the transport unit transports the card via the reader toward the switchback opening in a first transport direction along the transport path;
in response to an expiration of a first time period since activation of the motor, stop the motor and reactivate the motor such that the transport unit transports the card via the reader toward the second inlet in a second transport direction opposite to the first transport direction along the transport path;
control the reader to read the image on the card while continuing to drive the motor for the transport unit to transport the card in the second transport direction; and
in response to an expiration of the first time period since reactivation of the motor, stop the motor,
wherein the positioning mechanism is further configured to:
in response to the activation of the motor, move the reader from the first position to the second position by using the drive force from the motor; and
in response to the reactivation of the motor, maintain the reader at the second position while the transport unit transports the card in the second transport direction until an entirety of the card has passed the reader in the second transport direction, and then move the reader from the second position to the first position by using the drive force from the motor.

13. The image reading apparatus according to claim 12, further comprising a spring configured to urge the reader toward the first position.

14. The image reading apparatus according to claim 12, further comprising a transport surface facing up and disposed along the transport path,
wherein a distance between the reader at the second position and the transport surface is greater than a distance between the reader at the first position and the transport surface.

15. The image reading apparatus according to claim 14, wherein the distance between the reader at the second position and the transport surface is substantially equal to a standard thickness of the card.

16. The image forming apparatus according to claim 12, wherein the transport unit is further configured to transport a sheet from the first inlet to the second inlet in the second transport direction while the reader is positioned at the first position.

* * * * *